(12) United States Patent
Prechtl

(10) Patent No.: US 9,185,391 B1
(45) Date of Patent: Nov. 10, 2015

(54) ADJUSTABLE PARALLAX DISTANCE, WIDE FIELD OF VIEW, STEREOSCOPIC IMAGING SYSTEM

(71) Applicant: Actality, Inc., Groton, MA (US)

(72) Inventor: Eric F. Prechtl, Groton, MA (US)

(73) Assignee: Actality, Inc., Groton, MA (US)

( * ) Notice: Subject to any disclaimer, the term of this patent is extended or adjusted under 35 U.S.C. 154(b) by 0 days.

(21) Appl. No.: 14/307,077

(22) Filed: Jun. 17, 2014

(51) Int. Cl.
| | |
|---|---|
| H04N 15/00 | (2006.01) |
| H04N 13/02 | (2006.01) |
| H04N 5/247 | (2006.01) |
| H04N 5/232 | (2006.01) |
| H04N 5/225 | (2006.01) |

(52) U.S. Cl.
CPC ......... *H04N 13/0242* (2013.01); *H04N 5/2251* (2013.01); *H04N 5/23238* (2013.01); *H04N 5/247* (2013.01); *H04N 13/0239* (2013.01); *H04N 2213/001* (2013.01)

(58) Field of Classification Search
USPC ............................................................. 348/48
See application file for complete search history.

(56) References Cited

U.S. PATENT DOCUMENTS

| | | | | |
|---|---|---|---|---|
| 4,792,694 | A | 12/1988 | Shioya et al. | 250/558 |
| 5,703,604 | A | 12/1997 | McCutchen | 345/8 |
| 5,703,961 | A | 12/1997 | Rogina et al. | 382/154 |
| 6,141,145 | A | 10/2000 | Nalwa | 359/403 |
| 6,665,003 | B1 * | 12/2003 | Peleg et al. | 348/36 |
| 6,947,059 | B2 | 9/2005 | Pierce et al. | 345/629 |
| 7,015,954 | B1 | 3/2006 | Foote et al. | 348/218.1 |
| 7,224,382 | B2 * | 5/2007 | Baker | 348/46 |
| 7,243,364 | B2 | 7/2007 | Dunn et al. | 725/93 |
| 7,277,118 | B2 | 10/2007 | Foote | 348/36 |
| 7,347,555 | B2 | 3/2008 | Grover | 353/7 |
| 7,463,280 | B2 | 12/2008 | Steuart, III | 348/36 |
| 7,553,023 | B2 | 6/2009 | Grover | 353/7 |
| 7,710,463 | B2 | 5/2010 | Foote | 348/218.1 |
| 7,796,152 | B2 | 9/2010 | Grover | 348/42 |

(Continued)

FOREIGN PATENT DOCUMENTS

| | | | | |
|---|---|---|---|---|
| WO | WO 2011/142767 A1 | 11/2011 | | H04N 13/00 |
| WO | WO 2012/136388 A1 | 10/2012 | | H04N 13/02 |
| WO | WO 2013/081576 A1 | 6/2013 | | H04N 13/02 |

OTHER PUBLICATIONS

Aulinas, J., et al., "The SLAM Problem: A Survey," *Institute of Informactics and Applications*, 9 pages, (2008).

(Continued)

*Primary Examiner* — Dave Czekaj
*Assistant Examiner* — Leron Beck
(74) *Attorney, Agent, or Firm* — Sunstein Kann Murphy & Timbers LLP

(57) ABSTRACT

An imaging system and methods for using an imaging system where the operator is able to variably adjust the parallax distance for enhanced stereo performance are disclosed. In addition, by coordinating the parallax distance with the optical settings of the camera, artificial 3D experiences can be created that give a user the perception of observing a scene from a distance different than that actually employed. The imaging system may also include a plurality of stereo camera supersets, wherein a first one or more stereo camera supersets are positioned at a different height relative to a first stereo camera superset. Novel specific uses of the camera system, such as in capturing events of interest are described. Useful techniques for extracting or encoding wide field of view images from memory are also disclosed.

19 Claims, 26 Drawing Sheets

(56) References Cited

U.S. PATENT DOCUMENTS

| | | | |
|---|---|---|---|
| 7,872,665 | B2 | 1/2011 | Grover ............................ 348/47 |
| 7,982,777 | B2 | 7/2011 | Prechtl et al. ............ 348/211.11 |
| 8,004,558 | B2 | 8/2011 | Prechtl et al. .................... 348/48 |
| 8,249,992 | B2 | 8/2012 | Harkness et al. ................ 705/59 |
| 8,274,550 | B2 | 9/2012 | Steuart, III ...................... 348/36 |
| 8,326,113 | B2 | 12/2012 | Shinkai et al. ................ 386/224 |
| 8,334,895 | B2 | 12/2012 | Grover ............................ 348/47 |
| 8,525,825 | B2 | 9/2013 | Zhu et al. ...................... 335/419 |
| 8,544,047 | B2 | 9/2013 | Tu et al. ........................... 725/80 |
| 8,625,018 | B2 | 1/2014 | Bilbrey et al. ............ 348/333.01 |
| 8,676,034 | B2 | 3/2014 | Malin et al. .................... 386/291 |
| 2004/0001138 | A1 | 1/2004 | Weerashinghe et al. ........ 348/36 |
| 2006/0072020 | A1* | 4/2006 | McCutchen ............... 348/218.1 |
| 2008/0275881 | A1 | 11/2008 | Conn et al. ...................... 707/10 |
| 2008/0298674 | A1 | 12/2008 | Baker et al. ................... 382/154 |
| 2011/0164108 | A1* | 7/2011 | Bates et al. ...................... 348/36 |
| 2012/0105574 | A1 | 5/2012 | Baker et al. ..................... 348/36 |
| 2012/0223885 | A1 | 9/2012 | Perez ............................. 345/158 |
| 2012/0327185 | A1 | 12/2012 | Steuart, III ...................... 348/36 |
| 2013/0044181 | A1 | 2/2013 | Baker et al. ..................... 348/36 |
| 2013/0219459 | A1 | 8/2013 | Bradley ............................ 726/1 |
| 2013/0235164 | A1 | 9/2013 | Grover ............................ 348/47 |

OTHER PUBLICATIONS

Gordon, C., et al., "Anthropometric Survey of U.S. Army Personnel: Methods and Summary Statistics," TR-89-044, *US Army Natick Research, Development and Engineering Center*, p. 209, (1989).

LaValle, S., "Sensor Fusion: Keeping it Simple," *Oculus VR Blog* at http://www.oculusvr.com/blog/sensor-fusion-keeping-it-simple/ May 22, 2013, 3 pages.

\* cited by examiner

ADJUSTABLE PARALLAX DISTANCE, WIDE FIELD OF VIEW, STEREOSCOPIC IMAGING SYSTEM

TECHNICAL FIELD

Embodiments of the invention relate to wide field-of-view image recording devices and, more particularly, to wide field of view, stereoscopic camera systems.

BACKGROUND ART

U.S. Pat. Nos. 7,982,777 and 8,004,558, for inventions of the present inventor with others are hereby incorporated herein by reference in their entirety. They teach a biologically inspired arrangement of cameras (and/or camera pairs) that mimics the location of the eyes of a binocular animal (such as a human) as the head is turned side-to-side or up-and-down.

A differentiating characteristic of the above technology is that, due to the arrangement of cameras, it creates potential obscuration between neighboring cameras. This is done to realize the most simple and compact configuration (as a function of parallax distance) possible. And Prechtl et. al. describe, at length, techniques by which this obscuration can be addressed and managed.

A significant parameter affecting the performance of a stereo camera system is the parallax distance employed. Some practitioners have addressed the possibility of varying the parallax distance in stereo, such as in U.S. Pat. No. 7,224,382 and US Pat. Apps. #2013/0044181 and #2013/081576.

The era of video-on-demand (VOD) is well established. Consumers are able to purchase a wide variety of videos to consume, as desired, as part of their multimedia collections. Some prior art describes the capture of a scene from multiple cameras in different ways. This is taught in U.S. Pat. No. 8,326,113 and US Patent Application #2008/0275881.

There is also a large body of art that addresses the problem of managing electronic media. This is taught in U.S. Pat. Nos. 7,243,364, 8,527,549, 8,544,047, 8,548,735, and 8,676,034.

There is also art related to measuring the size of the audience watching an event, such as that taught in U.S. Pat. No. 8,249,992.

SUMMARY OF THE EMBODIMENTS

Embodiments of the present invention provide an improvement to the stereoscopic imaging system taught by Prechtl et. al. in U.S. Pat. Nos. 7,982,777 and 8,004,558. Various embodiments provide an imaging system where the operator is able to adjust the parallax distance for enhanced stereo performance. In addition, by coordinating the parallax distance with the optical settings of the camera, artificial 3D experiences can be created that give a user the perception of observing a scene from a distance different than that actually employed. Variable parallax distance embodiments are described that use adjustable mechanisms, static camera configurations or a combination of the two.

In addition, embodiments of the wide field-of-view system are described in novel applications such as for capturing live action, sports & entertainment, and for general security. Algorithms are also presented describing methods by which images may be encoded to compensate for the motion of the capturing platform.

In a first embodiment of the invention, a structure is described that incorporates a mechanism that can be used to adjust the parallax distance of a stereoscopic camera system.

In a second embodiment of the invention, a structure is described that arranges multiple supersets of cameras wherein each superset captures wide field of view stereoscopic images of a scene from a different parallax distance. In this second embodiment, common arm structures are used to mount similarly oriented digital cameras from different supersets.

In a third embodiment of the invention, a structure is described that arranges multiple supersets of cameras wherein each superset captures wide field of view stereoscopic images of a scene from a different parallax distance. In this third embodiment, separate arm structures are used for each superset.

In a fourth embodiment, an application of wide field-of-view imaging is used to capture events of interest. A novel process by which scenes can be captured and saved by multiple end-users, simultaneously, is described.

In a fifth embodiment, a method of encoding orientation data along with video data from a wide field of view camera system that is moving is described. The orientation data can be used to more smoothly access and view the video data.

More particularly, in one embodiment, the invention provides a wide field-of-view stereoscopic camera system. In this embodiment, the system includes:

a support structure having M arms, where M is an integer equal to or greater than 2, each of the arms being spaced around a constructive circle and having a mount point, coincident with the circle, defining a radius of the circle, wherein the radius is half of a parallax distance, and the circle defines a horizontal plane and the circle defines a constructive right cylinder that contains that circle and that has an axis perpendicular to the horizontal plane and wherein each of the arms has a length adjustment to vary the distance between the center of the circle and the mount point;

N digital cameras, wherein N is at least equal to M, each digital camera having a lens with a focal point and an optical axis and producing an image encoded in a digital output and having a horizontal field of view and a vertical field of view;

the digital cameras mounted to the support structure so that each arm supports at least one digital camera so that (i) the focal point thereof is proximate to such arm's mount point and (ii) the optical axis thereof is generally tangent to the cylinder; and an image processor, coupled to the digital output of each of the N digital cameras, to form a stereo view pair, wherein the processor forms a left view from the digital outputs of a first set of the N cameras and forms a right view from the digital outputs of a second set of the N cameras, wherein the first and second sets are disjoint.

In a related embodiment, at least one digital camera is mounted so that its horizontal field of view is subject to a partial obscuration by an object associated with an adjacent arm, and wherein the image processor compensates for the obscuration at least in part by a view available from one of the digital cameras mounted on an adjacent arm.

Optionally, the digital camera subject to the partial obscuration is mounted with an outward angle such that the partial obscuration is minimized. Also optionally, the left view and the right view both cover the 360 degree horizontal field of view. As a further option 1 or more of the N digital cameras are mounted such that the optical axis is not parallel with the horizontal plane.

In a further related embodiment, 2 or more digital cameras are mounted proximal to at least one mount point such that their vertical fields of view partially overlap to capture an extended elevation field of view.

In another related embodiment, each of the arms is pivotally coupled to a mounting pole that passes through the center of the circle and is disposed perpendicularly with respect to the horizontal plane, each of the arms having a link pivotally attached to a circumferential support that is slidably coupled to the mounting pole, so that motion of the circumferential support along the mounting pole adjusts the radius of the circle and therefore the parallax distance.

In yet another related embodiment, each of the arms is coupled to a sliding arm mechanism that allows the arms to move in substantially radial direction and that includes a rack and pinion, so that rotational motion of the pinion around its central axis adjusts the radius of the circle and therefore the parallax distance.

Optionally, the system further includes a motorized drive coupled to at least one of the arms, and a controller coupled to the motorized drive, so as to cause adjustment in length of at least one of the arms, and the controller is coupled to one of the cameras on the at least one of the arms to receive from the camera at least one parameter of the camera and to cause an adjustment in length of at least one of the arms responsive to a change in the at least one parameter.

In another related embodiment, the processing algorithm makes use of projective transformations to form the left view and the right view. Optionally, the processing algorithm averages out the image quality of the aggregate set of pixels from the images of all N cameras to create a smooth transition in color, contrast, or white levels in the left view and the right view.

In a further related embodiment, the stereo pair of views is formatted to be compatible with a 3D display technology.

In another related embodiment, the image processor further operates on the left view and the right view to estimate the distance of items from the camera system using stereo triangulation.

Optionally, the system is used in the application of telerobotic platform control, surveillance, object tracking, facial recognition, access control, traffic control, collision avoidance, sports or entertainment event viewing, mapping or surveying, telepresence, real estate promotion, restaurant promotion, hotel promotion, remote tourism, thrill rides, gaming, or training.

In another embodiment, the invention provides a wide field-of-view stereoscopic camera system. This embodiment includes:

a support structure having L sets of arms, where L is an integer greater than 1, and each set has at least 2 arms, each of the arms in a particular one of the sets being spaced around a distinct one of L constructive circles, and having a mount point, coincident with the distinct one circle, defining a radius of the circle, wherein the radius is half of a parallax distance, and the distinct one circle defines a plane that is parallel to a horizontal plane and a constructive right cylinder containing the distinct one circle and having an axis perpendicular to the horizontal plane;

N digital cameras, wherein N is at least equal to the number of arms in the camera system, each digital camera having a lens with a focal point and an optical axis and producing an image encoded in a digital output and having a horizontal field of view and a vertical field of view, the digital cameras mounted to the support structure so that each arm supports at least one digital camera so that (i) the focal point thereof is proximate to such arm's mount point and (ii) the optical axis thereof is generally tangent to the cylinder corresponding to that mount point; and an image processor, coupled to the digital output of each of the N digital cameras, that forms L independent stereo view pairs, wherein, for each stereo view pair, the processor forms a left view from the digital outputs of a first set of the N cameras and forms a right view from the digital outputs of a second set of the N cameras, wherein the first and second sets are disjoint.

Optionally, at least one digital camera is mounted so that its horizontal field of view is subject to a partial obscuration by an object associated with an adjacent arm, and wherein the image processor compensates for the obscuration at least in part by a view available from one of the digital cameras mounted on an adjacent arm. As a further option, the digital camera subject to the partial obscuration is mounted with an outward angle such that the partial obscuration is minimized.

In another related embodiment, the left view and the right view of at least one set of L cameras both cover the 360 degree horizontal field of view.

In another related embodiment, 1 or more of the N digital cameras are mounted such that the optical axis is not parallel with the horizontal plane. Optionally, 2 or more digital cameras are mounted proximal to at least one mount point such that their vertical fields of view partially overlap to capture an extended elevation field of view.

In another related embodiment, the digital cameras mounted proximal to mount points corresponding to one constructive cylinder are further mounted at an elevation with respect to the horizontal plane such that their fields of view are not obscured by any digital camera mounted proximal to a mount point that corresponds to a different constructive cylinder.

Also optionally, each of the arms in at least one of the L sets of arms has a length adjustment to vary the distance between the center of the circle and the mount point.

Also optionally, the image processor further operates on the left view and the right view, of one or more of the L sets of digital cameras, to estimate the distance of items from the camera system using stereo triangulation.

Alternatively or in addition, the processor, responsive to a signal received by the processor, provides a selected one of the stereo view pairs as an output.

Optionally, each of the L stereo pair of views is formatted to be compatible with a 3D display technology.

BRIEF DESCRIPTION OF THE DRAWINGS

The foregoing features of embodiments will be more readily understood by reference to the following detailed description, taken with reference to the accompanying drawings, in which.

DETAILED DESCRIPTION OF SPECIFIC EMBODIMENTS

Definitions

Figure 1:
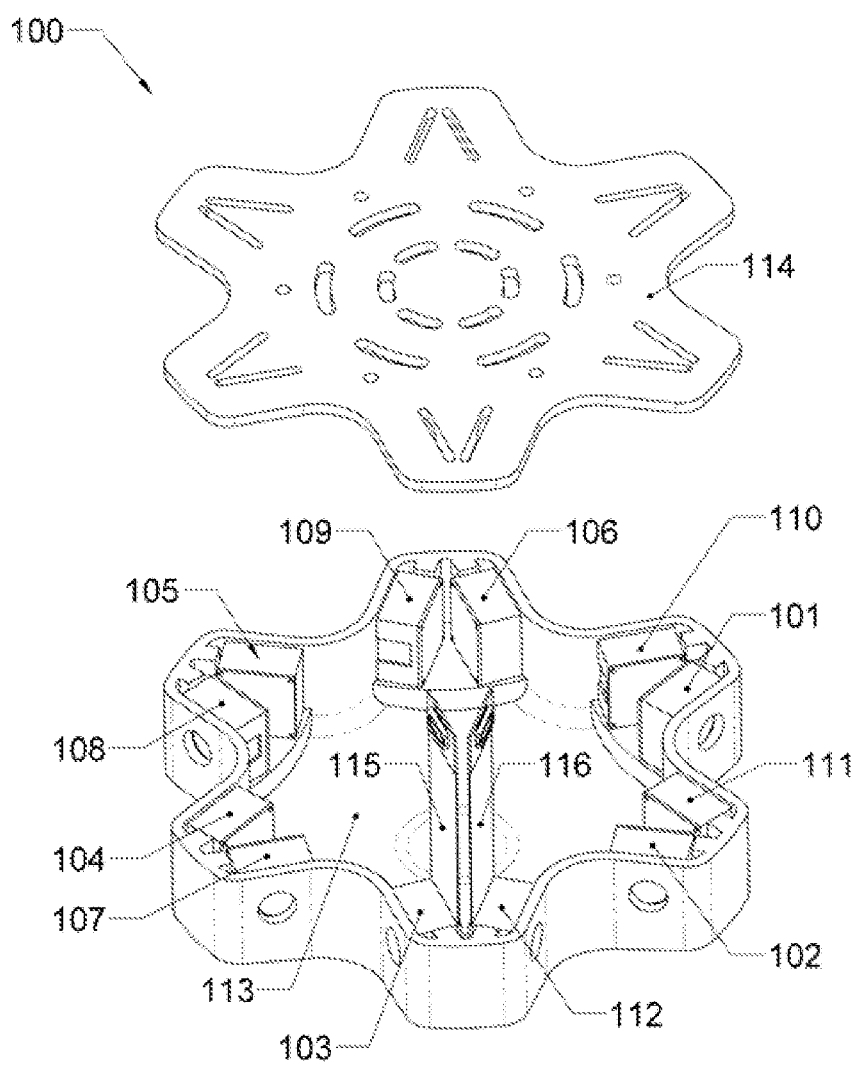
FIG. 1 is an isometric view of the camera system design according to the prior art of Prechtl et. al. with a parallax distance that matches the interpupillary distance of the human head.

As used in this description and the accompanying claims, the following terms shall have the meanings indicated, unless the context otherwise requires:

A "digital camera" is a device composed of an image sensor and a lens. The image sensor is further composed of a pixel array, in a plane, that operates to convert optical energy from the electromagnetic spectrum into a digital electrical signal. Visible spectrum (390-700 nm) image sensors are the most familiar. However, embodiments of the invention described herein can employ image sensors that operate over a wide range of the electromagnetic spectrum, including visible, infrared and ultraviolet wavelengths. This definition is meant to also capture the so-called "light field" class of image sensors that capture an overall light field and allow users to refocus images in a post processing fashion (see www.lytro.com for an example). The lens is an optical element transparent to the desired region of the electromagnetic spectrum. The lens can be a separated element or an array of micro lenses distributed above the active pixel array of the image sensor or some variation to operate on more exotic types of image sensors (such as light field sensors); in the case of an array of micro lenses, the optical axis (defined below) will be understood to pass through the centroid of the focal points of the micro lenses in the array.

A "focal point" is a constructive location in space through which incoming electromagnetic waves converge before hitting the image sensor. In cases where the digital camera may use a lens with multiple focal points (e.g. in cases using an array of micro lenses), for the purposes of this document, the "focal point" is understood to mean a single reference point within the digital camera that is related to the general focus of light rays onto the image sensor.

A digital camera may also be referred to as a "camera daughter board" to acknowledge that it may incorporate additional components that perform processing tasks, ancillary to the capture and digitizing of the incoming spectrum of light, prior to transmitting the image data to a central processing hub.

A "miniature digital camera" is a digital camera having a lens mounted directly to a digital image sensor or to a digital image sensor circuit board.

The "frame rate" of an image sensor is the number of times per second the active pixels in an image sensor are sampled. For the purposes of this document, frame rates can vary from as slow as a single activation at a time (a "snapshot") up through high speeds, exceeding 100 frame samples per second. Throughout the document, the term 'video' is used for convenience, suggesting a sequential series of image frames. However, it is understood that this term will include situations where the 'video' is just a single snapshot. It is further understood that the term 'image stream' will be used synonymously to the word 'video'.

The "optical axis" of a camera is defined as a line perpendicular to a plane defined by the pixel array of the image sensor, from a point at the centroid of that array of pixels, passing through a focal point of the camera lens, and passing through a point within the imaged scene.

A "horizontal field of view" is an angular measurement of the horizontal area that is visible to an image sensor. The angular measurement is made in a plane defined by the optical axis and a horizontal line of pixels in the active pixel array of the corresponding image sensor.

A "vertical field of view" is an angular measurement of the vertical area that is visible to an image sensor. The angular measurement is made in a plane defined by the optical axis and a vertical line of pixels in the active pixel array of the corresponding image sensor. The vertical line of pixels is perpendicular to the horizontal line of pixels used to define the horizontal field of view.

A "viewing frustum" is a three dimensional rectangular pyramidal region characterized by a horizontal field of view and a vertical field of view that are not necessarily equal. The vertex of this pyramidal region is defined so that respective sides of the frustum correspond to the area visible by an image sensor. The vertex typically coincides with the focal point of the digital camera lens.

A "panoramic" view is an image characterized by a horizontal field of view and vertical field of view as follows: The horizontal field of view is larger than the horizontal field of view of any one camera in the system and can be as large as the full 360 degree horizontal region. The vertical field of view is less than 90 degrees.

An "omni-directional" view is an image characterized by a horizontal field of view and vertical field of view as follows: The horizontal field of view is larger than the horizontal field of view of any one camera in the system and can be as large as the full 360 degree horizontal region. The vertical field of view is greater than or equal to 90 degrees and can be as large as the full 180 degree vertical elevation. In the case where the horizontal field of view is 360 degrees and the vertical field of view is 180 degrees, this would define the full 4π-steradian spherical area surrounding the camera.

A "wide field-of-view" is a panoramic or omni-directional view. In the preferred embodiment, the stitched output field-of-view of the camera would be a single cohesive viewing frustum. However, the invention allows for embodiments where the wide field of view might incorporate multiple separate large fields-of-view that together will be considered the camera's 'wide' field-of-view.

A "monoscopic image" is a traditional, 2D representation of a scene. It typically signifies the capture of a scene from a single point of reference.

A "stereoscopic camera system" is composed of a set of cameras such that the output of one subset of these cameras can be used to form a left eye view of an imaged scene simultaneously with the output of a disjoint subset of these cameras being used to form a right eye view of substantially overlapping fields-of-view.

A "stereoscopic image" describes the representation of a scene that was captured with a stereoscopic camera system.

A "stereo view pair" is a description of a stereoscopic image and is specifically composed of a left-eye view of a scene and a right-eye view of a scene.

The "parallax distance" is defined with respect to a "central point" of a stereoscopic camera system. One half of the parallax distance defines the lateral offset from this central point of the focal point of, preferably all but, at least one of the digital cameras in the left-eye set. In a similar fashion, one half of the parallax distance defines the lateral offset from this central point of the focal point of, preferably all but, at least one of the digital cameras in the right eye set.

The "parallax circle" is centered on the central point of a stereoscopic camera system. Its diameter is equal to the parallax distance.

The "parallax cylinder" is a right circular cylinder whose axis passes through the central point of a stereoscopic camera system and that is perpendicular to the plane defined by the parallax circle. Its diameter is equal to the parallax distance.

The "interpupillary distance", abbreviated as 'IPD', is the distance between the pupils of a subject's two eyes.

The "arms" of the camera system represent structural members that provide support for the digital cameras at a specified mount point. While the arms in the illustrated embodiments represent relatively simple radial elements, it is understood that the 'arms' of the camera system will include any structural member that provides adequate support for the digital cameras while allowing the functional performance of the specified embodiment.

The optical axis of a digital camera is "generally tangent" to a constructive right cylinder when the optical axis is oriented so that it is within 30 degrees of a tangent to that cylinder and so that the tangent and the optical axis are co-planar.

The term "Pancam" is a general identifier used for convenience in referring to the wide field-of-view, stereoscopic camera systems in this document.

Introductory Camera Design

Embodiments of the invention described in this document are focused on the capture of a wide field-of-view, stereoscopic image with either a variable parallax distance or from the perspective of multiple parallax distances, simultaneously. The designs are enabled through a camera configuration previously taught by Prechtl et. al. in U.S. Pat. Nos. 7,982,777 and 8,004,558. In those descriptions, the parallax distance is treated as a static design parameter. To understand embodiments of this new invention, it is illustrative to briefly consider this particular prior art.

FIG. 1 is an isometric view of the camera system design according to the prior art of Prechtl et. al. with a parallax distance that matches the interpupillary distance of the human head. The camera system incorporates 6 left eye camera daughter boards 101, 102, 103, 104, 105, and 106, and 6 right eye camera daughter boards 107, 108, 109, 110, 111, and 112 mounted to a support structure 113. Each camera daughter board contains a digital camera composed of an image sensor and lens and optional ancillary processing electronics. The cameras are arranged in stereo camera pairs in the figure but such a pairing is not a requirement for operation since the left and right eye camera feeds are processed independently.

The central processing electronics for the camera system are not shown in FIG. 1. These components would be mounted just above or just below the imaging head 100. In this embodiment, each daughter board communicates its image data to the central processing electronics through a flat flexible cable (FFC). For clarity, only two of the 12 FFC cables are shown in FIG. 1; cable 115, that interfaces with camera daughter board 103 and cable 116, that interfaces with camera daughter board 112. A cover 114 is preferably designed to fit on top of the support structure with access slots for the FFC cables and vent holes to promote cooling.

Figure 2:
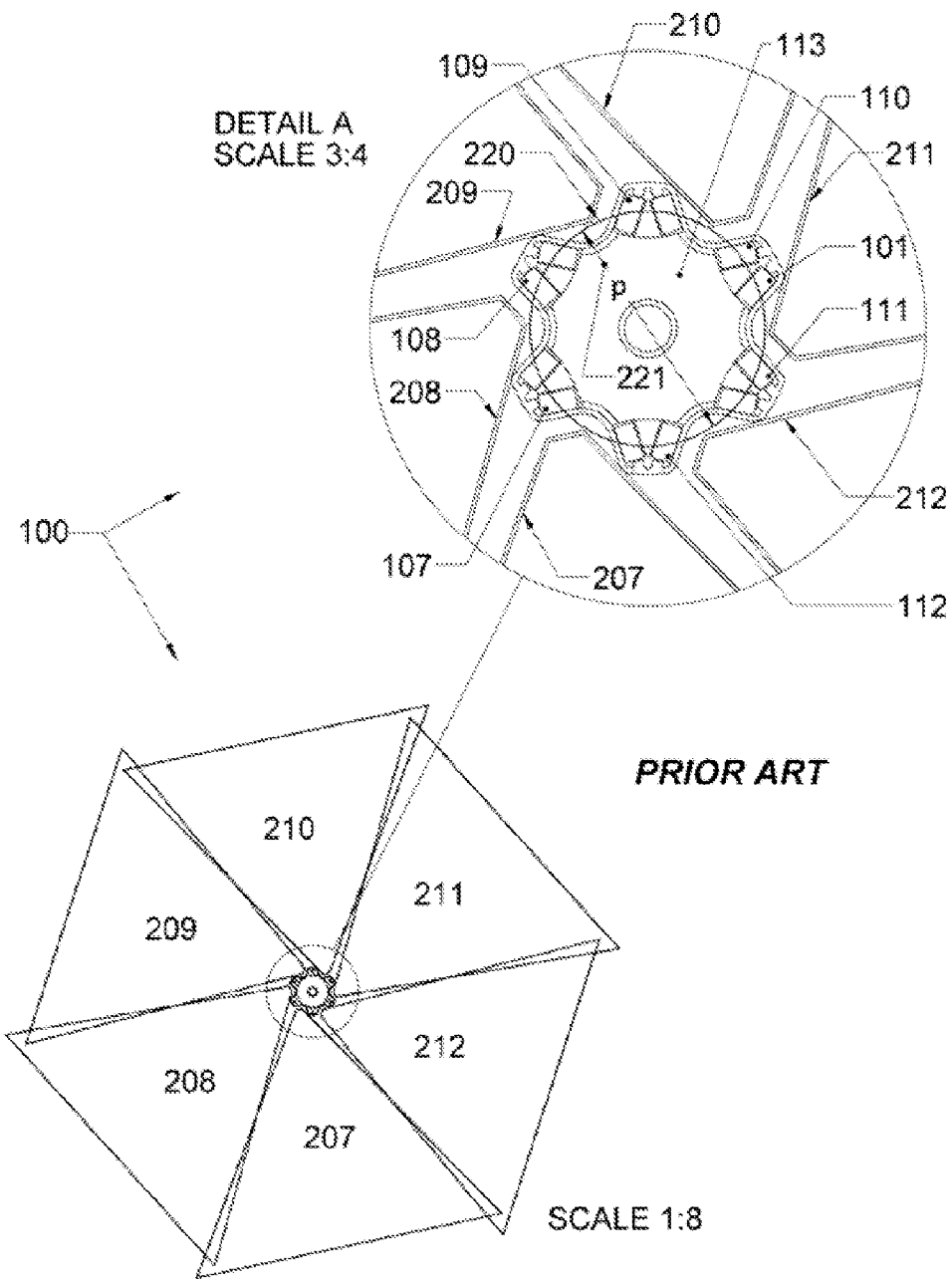
FIG. 2 is a top view of the prior art camera system illustrated in FIG. 1.

FIG. 2 is a top view of the prior art camera system illustrated in FIG. 1. This figure includes wire-frame viewing frustrums illustrated for the six right eye cameras. The figure shows a zoomed out view in the bottom left and a zoomed in, detail view in the upper right. Viewing frustums 207, 208, 209, 210, 211, and 212 correspond to camera daughter boards 107, 108, 109, 110, 111, and 112, respectively.

This figure illustrates how each digital camera is mounted such that the focal point of its lens is coincident with a parallax circle 220, with a diameter 221, p. This particular embodiment was designed to have a parallax distance 221, p, of 63.5 mm, matching the average interpupillary distance of the human head. By using a 3 mega-pixel image sensor in each digital camera, such as OmniVision P/N OV03640-VL9A (sold as part of a Global Digital Star Limited camera (P/N G-Q3B03)), this design can deliver an overall resolution better than 2 arcminutes per pixel, which is the approximate visual acuity of a human. When the image stream from this camera system is displayed to a human end-user, because of the parallax distance and resolution, it will deliver a highly immersive experience.

FIG. 2 also highlights the design decision to angle the cameras outward by a small amount. For example, camera daughter board 111 is oriented such that the left side of viewing frustum 211 is approximately tangent to the structure 113 near the outer corner of camera daughter board 101. All cameras daughter boards are oriented in a similar manner. In the preferred embodiment, the cameras would be oriented so that their optical axes are tangent to the parallax circle 220. But this would result in more obscuration than desired in this particular configuration.

Prechtl et. al. teach multiple ways to deal with this obscuration. One useful technique is to use the image feeds from a forward camera to fill in the obscured region of the rear camera. So, for example, in this design, a portion of the video feed from camera 110 would be used to replace the obscured region of camera 111. Identical techniques would be used for all of the cameras in the system. Another technique is to simply angle the cameras outward. This latter technique is adopted in the design illustrated in FIG. 1 and FIG. 2.

General Design Considerations

Most of the following discussion assumes a camera design composed of multiple equivalent digital cameras. This is done for convenience and should not be considered a limitation on the design or the embodiments of the proposed invention. For example, it is possible to build up camera designs composed of digital cameras with differing levels of capabilities and performance. The design considerations of such a system are addressed at the end of this sub-section.

A Pancam design can be built around two fundamental performance specifications: the parallax distance, p, and the resolution of image capture, r. The resolution, defined in units of arc-minutes per pixel, represents the angular region subtended by each pixel in an image. As a reference, the visual acuity of a human is approximately 2 arcminutes-per-pixel.

In-Plane Considerations

To satisfy a resolution requirement, the individual digital cameras must satisfy a specific relationship between number of sensor pixels and lens field-of-view. For example, if the image sensor of the digital camera has $n_x$ horizontal pixels in its array, then it must integrate a lens with a horizontal field-of-view, $\gamma_x$, in degrees, that satisfies $$\gamma_x \leq \frac{r(n_x)}{60}$$

A similar relation exists relating the number of vertical pixels, $n_y$, to the vertical field of view, $\gamma_y$.

The overall camera system will be designed to provide a total horizontal field of view, $\Theta$, and a total vertical field of view, $\Phi$. $\Theta$ is typically between $\gamma_x$ and 360°. $\Phi$ is typically between $\gamma_y$ and 180°.

The number of digital cameras (per eye), distributed circumferentially, to satisfy the horizontal field of view requirement at the desired resolution is[1]

[1] Note that an $N_\theta$ value less than this could be used, but it would result in incomplete circumferential coverage of the area. A similar point holds for $N_\phi$, defined below.

$$N_\theta \geq \frac{\Theta}{\gamma_x}$$

and, in fact, $N_\theta$, will usually be the next integer greater than this ratio of fields of view. However, it could be an even greater integer number if a larger overlap in the field-of-view of neighboring imagers is desired. Some overlap between the viewing frustums of neighboring digital cameras is preferred to assist in matching control points as part of the calibration and stitching operations. Excessive overlap is not seen as necessary or productive from an engineering or cost perspective.

Note that $N_\theta$ can be an odd or even integer. An even value of $N_\theta$ is preferred as it will result in matched left-eye and right-eye digital camera pairs, separated by a parallax distance, which more naturally mimics the position of a biologically inspired pair of eyes as the head is rotated side-to-side and back-and-forth. The design implications of using an odd $N_\theta$ value are addressed below.

The parallax distance, p, can be any value from the width of the digital camera in use to a value as large as desired. When capturing images for use by a human, the preferred parallax distance would match the interpupillary distance of the human end-user or an average human end-user.

Unfortunately, there is no one interpupillary distance for humans. Table 1 shows the results from a study of nearly 4000 humans. There is a wide range of interpupillary distance values, from 52 mm to 78 mm. It's reasonable to use an average human interpupillary distance of 63.5 mm for general design and discussion. However, this does suggest that there would be value in using a mechanism whereby the parallax distance of a stereo rig could be tuned to match the interpupillary distance of the user.

TABLE 1

Interpupillary Distance. Distance between the two pupils on a large sampling of men and women [Gordon89].

| Gender | Sample Size | Mean [mm] | Standard Deviation [mm] | Minimum [mm] | Maximum [mm] |
| --- | --- | --- | --- | --- | --- |
| Male | 1771 | 64.7 | 3.7 | 52 | 78 |
| Female | 2205 | 62.3 | 3.6 | 52 | 76 |

Figure 3:
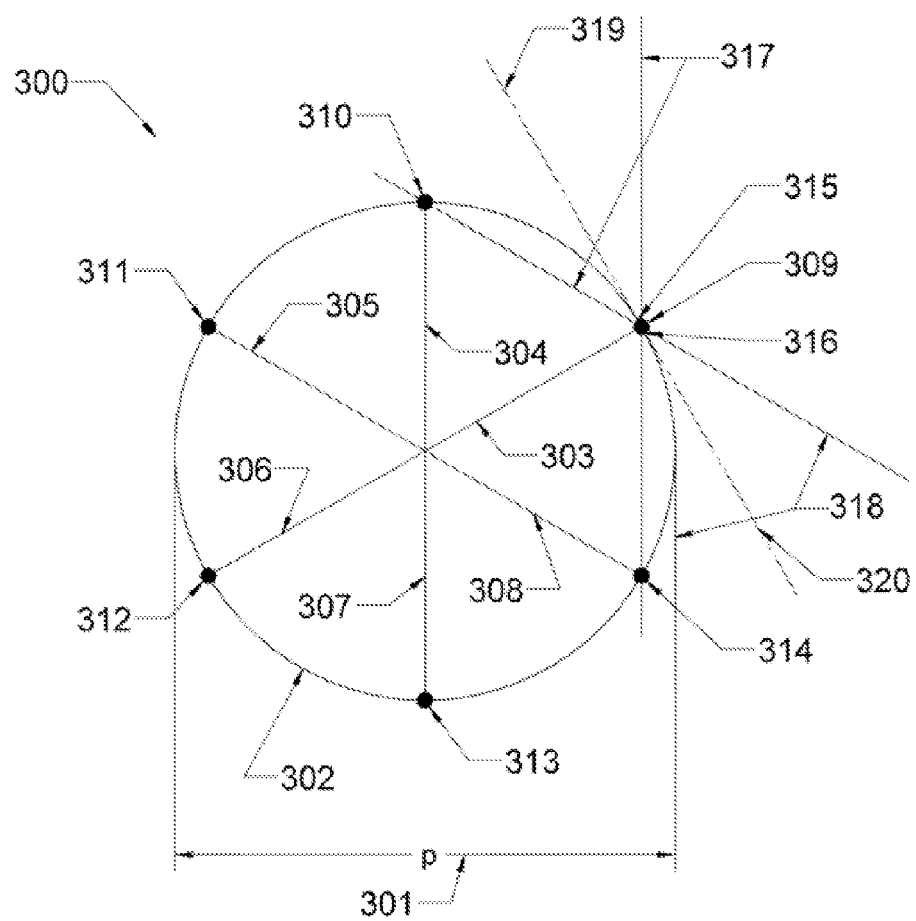
FIG. 3 is an illustration of the underlying geometry of a general camera system design with an even number of evenly spaced mount points in accordance with an embodiment the present invention.

FIG. 3 is an illustration of the underlying geometry of a general camera system design with an even number of evenly spaced mount points in accordance with an embodiment the present invention. Specifically, it illustrates the ideal geometry 300 for a 360° wide field-of-view in-plane stereoscopic camera with 6 digital cameras per eye. A desired parallax distance 301 is achieved by mounting the digital cameras around the parallax circle 302. Since $N_\theta=6$, 6 evenly spaced constructive radial segments 303, 304, 305, 306, 307, and 308 are drawn 60° apart. (Note that because $N_\theta$ is even, these $N_\theta$ radial segments could be grouped into $N_\theta/2$ co-linear diameter segments of the circle 302. However, for generality, radial segments are used.)

The intersection between each radial segment and the parallax circle 302 define $N_\theta$ idealized "mount points" 309, 310, 311, 312, 313, and 314. The preferred intention is to locate both a left-eye digital camera and a right-eye digital camera adjacent to each other at each of these mount points. For example, idealized right eye digital camera 315, with viewing frustrum 317 and idealized left-eye digital camera 316 with viewing frustum 318 are drawn at ideal point 309. (To highlight the geometry for discussion purposes, the viewing frustums are drawn with the minimum required 60° of coverage.) Because the digital camera bodies are considered infinitesimal in this figure, no obscuration issues come into play. Thus, the digital cameras are oriented such that their optical axes 319 and 320 are in the plane and exactly tangent to the parallax circle 302, pointing in opposite directions. By mounting adjacent digital cameras to these mount points, a minimum sized camera structure (for a given parallax distance) is realized. This is ideal in that it results in a minimum distance between the nodal points of neighboring digital cameras, which will minimize any irregularities in the stitched image due to parallax.

This mounting configuration would only be possible if the digital camera bodies themselves were infinitesimal. In reality, the digital cameras will have a finite size and allowances must be provided to dissipate heat and facilitate appropriate electrical interfaces. Thus, the two digital cameras must be mounted a small operational distance away from these mount points. This was illustrated in FIG. 1 and FIG. 2.

Figure 4:
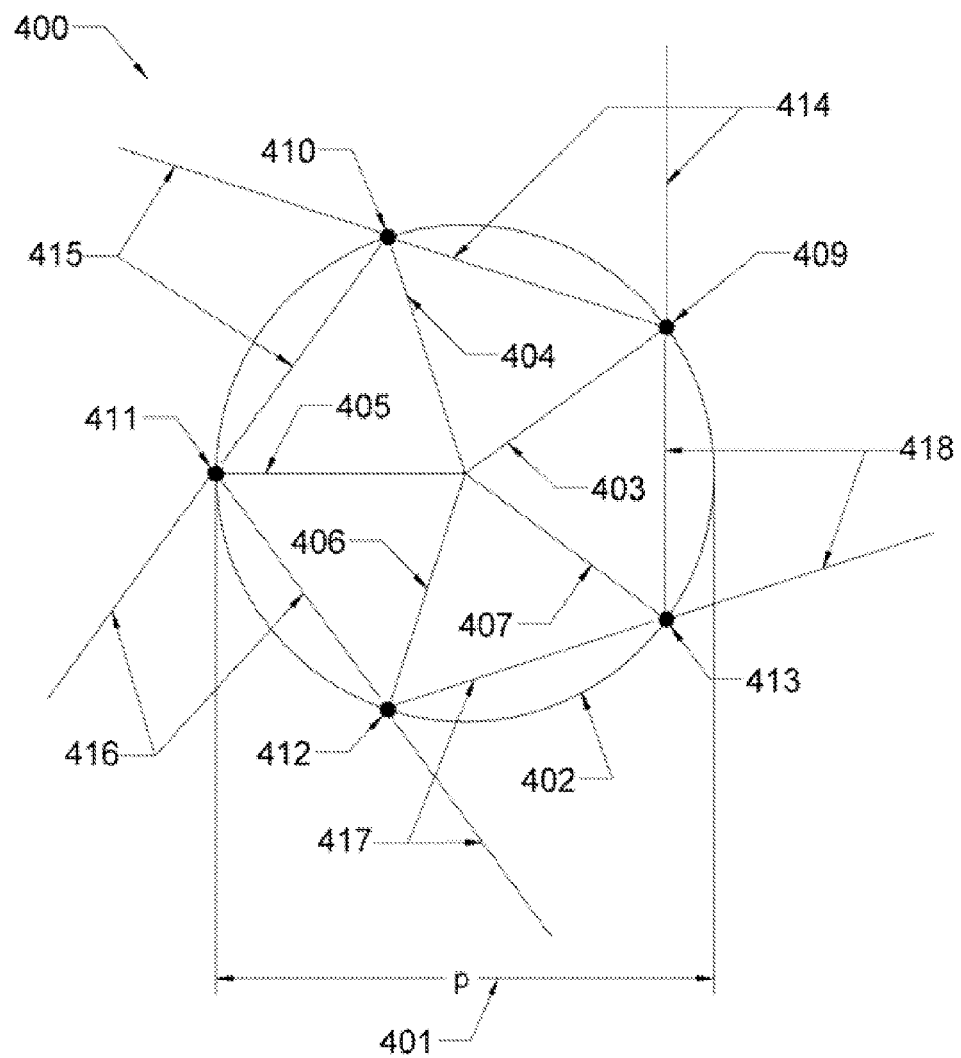
FIG. 4 is an illustration of the underlying geometry of a general camera system design with an odd number of evenly spaced mount points in accordance with an embodiment the present invention.

FIG. 4 is an illustration of the underlying geometry of a general camera system design with an odd number of evenly spaced mount points in accordance with an embodiment the present invention. It illustrates an arrangement where the number of required digital cameras (per eye), $N_\theta$, is odd. Specifically, it illustrates the idealized geometry 400 of an in-plane design with a 5-camera per eye (10 digital cameras in all) configuration. Defined around the parallax circle 402 are 5 constructive radial segments 403, 404, 405, 406, and 407 and 5 mount points 409, 410, 411, 412, and 413. Adjacent left- and right-eye digital cameras can be mounted to these points and as long as the horizontal field of view of each viewing frustum is greater than or equal to 72°, full 360° horizontal coverage is realized. This is illustrated by showing the 5 right eye digital camera viewing frustums 414, 415, 416, 417, and 418.

The same stitching and blending algorithms could be applied to both the left-eye and right-eye sets of digital cameras. The difference is that 5 unique sets of digital camera pairs cannot be identified. However, if the stitching and blending is done in a consistent fashion, it is possible to overlay the two resulting wide field-of-view images such that an immersive stereo effect is realized.

Non-uniform and non-symmetric camera designs are also taught. For example, an overall field of view, $\Theta$, less than 360° could be built where not every mount point has two adjacent digital cameras mounted.

It is also possible to realize an architecture with a mix of digital cameras having different performance specs. For example, any performance specifications could be varied from digital camera to digital camera, such as resolution, pixel array size, field of view, gain, zoom, dynamic range or even sensitivity to different regions of the electromagnetic spectrum. While these are not preferred embodiments, if called for, these kinds of heterogeneous designs could be realized.

Figure 24A:
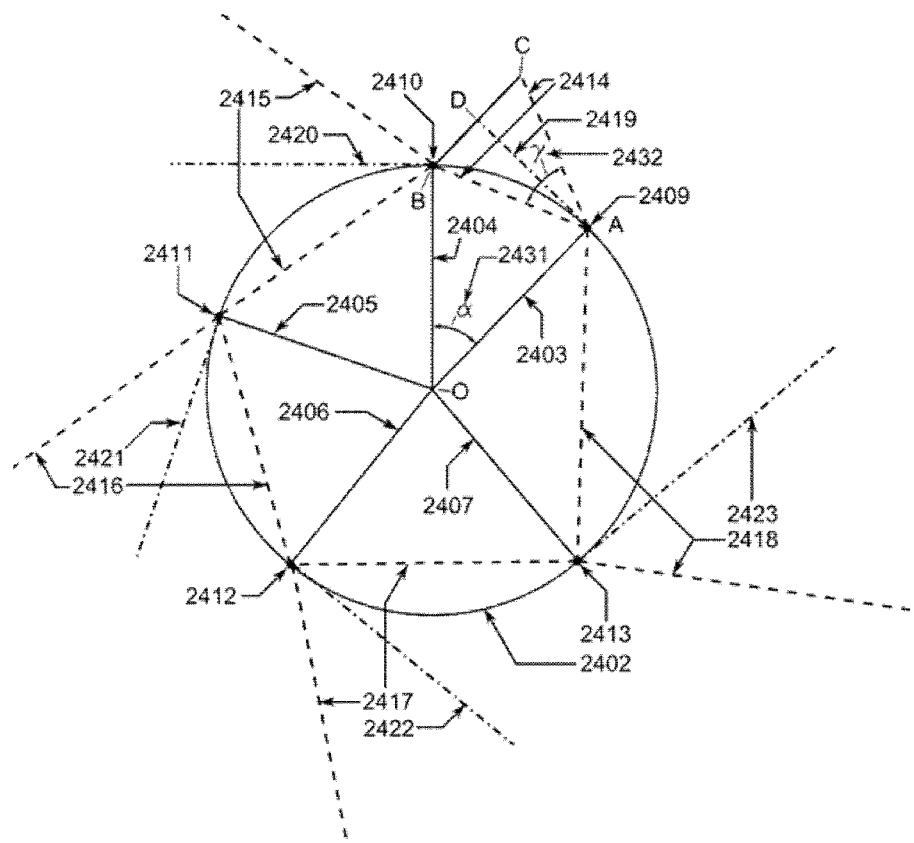
FIG. 24a is an illustration of the underlying geometry of a general camera system design with an odd number of unevenly spaced mount points. The right eye viewing frustums are included to support the discussion in accordance with an embodiment the present invention.

FIG. 24a is an illustration of the underlying geometry of a general camera system design with an odd number of unevenly spaced mount points. It corresponds to an in-plane, 5-camera per eye design. It shows a parallax circle 2402 with five arms 2403, 2404, 2405, 2406, and 2407 that are spaced in an uneven fashion. There could be a number of possible reasons for such a design, such as using image sensors with differing resolution levels or a desire to provide varying resolution around the circumference.

There still are five mount points identified at 2409, 2410, 2411, 2412, and 2413. At each of these points, left- and right-eye idealized digital cameras are mounted as before. But to get the full 360° coverage, the minimum required horizontal field of view for each viewing frustum will differ as a function of camera position. FIG. 24a shows the minimum required horizontal field of view for each of the five right-eye viewing frustums 2414, 2415, 2416, 2417, and 2418 which correspond to the 5 right eye digital cameras. The optical axes 2419, 2420, 2421, 2422, and 2423 for each digital camera is shown exactly tangent to the parallax circle 2402.

By orienting the idealized right eye digital camera at mount point 2409 such that its optical axis is tangent to the parallax circle 2402, the in-plane isosceles viewing frustum triangle ABC becomes similar to isosceles triangle OAB, indicating that the field of view angle, $\gamma$, 2432, required to provide coverage of the scene up to the neighboring digital camera at mount point 2410, is exactly equal to the angle, $\alpha$, subtended between the support arms 2403 and 2404. The same geometric relation holds for all digital cameras. Thus, by using digital cameras with appropriately sized fields of view, full panoramic coverage can be captured using such a non-uniform camera design.

Figure 24B:
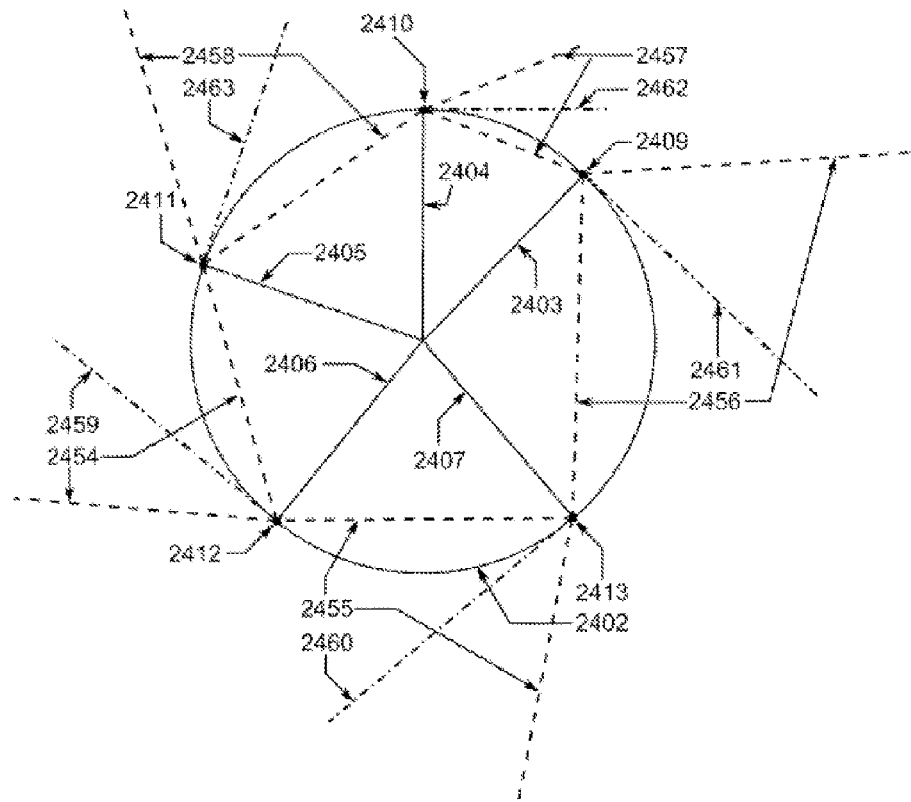
FIG. 24b is an illustration of the same camera system design of FIG. 24a highlighting the left eye viewing frustums to show the complementary arrangement.

FIG. 24b is an illustration of the same camera system design of FIG. 24a highlighting the left eye viewing frustums to show the complementary arrangement. Specifically, the complementary left-eye frustums 2454, 2455, 2456, 2457, and 2458 and the optical axes 2459, 2460, 2461, 2462, and 2463 are illustrated to show their orientation.

This non-uniform configuration is not the preferred embodiment. However, it is presented to show that such non-uniform designs do qualify as possible embodiments of the underlying invention.

Elevated Elevation Considerations

Assuming a full 360° horizontal field of view, the fraction of the $4\pi$-steradian omni-directional space captured by a particular imaging solution, centered on a horizontal plane, is given by $\sin(\Phi/2)$, where $\Phi$ is the vertical field of view of the design. For an in-plane, panoramic camera design, the effective vertical field of view, $\Phi$, will approximately match the field of view of each digital camera, i.e. $\Phi=\gamma_y$. For example, a six camera-per-eye Pancam design built around OmniVision P/N OV03640-VL9A image sensors would deliver a vertical field of view of 50.9 degrees, thus capturing approximately 43% of the omni-directional space.

Extended elevation designs can be realized to increase the fraction of coverage. This is achieved by placing imagers in locations that would mimic the position of the eyes as the head is tilted forward or backward. In this case, for a desired vertical field of view, $\Phi$, the number of required out-of-plane digital cameras per eye, $N_\phi$, will satisfy $$N_\varphi \geq \frac{\Phi}{\gamma_y}$$

Again, $N_\varphi$ will usually be the next integer greater than this ratio but could exceed this value to ensure greater overlap. To ensure improved high elevation coverage, it may be necessary to use image sensors with greater horizontal field of view coverage. This would be a decision made on a case-by-case basis.

All of the design considerations described in the last subsection in connection with in-plane designs hold for extended elevation designs. The primary difference is that while digital cameras would be located near the mount points identified in FIG. 3, FIG. 4, or FIG. 24, their optical axes would now be oriented tangent to a parallax cylinder (as opposed to a parallax circle) where the diameter of the cylinder matches the desired parallax distance.

In such a design, employing for example, OmniVision P/N OV03640-VL9A image sensors, a 360 degree horizontal× 140 degree vertical view can be realized using an $N_\varphi$ value of 3, resulting in the coverage of 95% of the 4π-steradian omnidirectional space.

Extended elevation embodiments are described in more detail below, in connection with FIG. 11-FIG. 13.

Adjusting Parallax Distance

The parallax distance is an important element governing the performance of a stereoscopic camera system. By matching the parallax distance to the interpupillary distance of the end-user, optimal stereoscopic immersiveness can be realized. However, it has also been widely taught that there are situations where using an alternative parallax distance could be of use. For example, in the field of hyper-stereo imaging, a larger parallax distance is used to introduce greater disparity between the captured images. This can be used when imaging distant objects to enhance the depth effect.

A significant problem in using hyper stereo is that it often enhances the apparent depth of objects more than the brain expects, which can be disconcerting for users. A useful way to compensate for this is to adjust the optics in coordination with the parallax distance adjustment. For example, consider a situation where objects 100 meters away are captured with a parallax distance of 127 mm (twice that of an average human). By adjusting the zoom also by a factor of 2, the object will appear with the same size and perceived depth as if it is 50 meters away. If the user chose to scan around the panoramic scene from such a zoomed-in set of cameras, the effect would resemble that seen when looking through a set of binoculars and turning one's head. The scene would spin by at a faster rate, but the brain would be able to process the scene in a reasonable fashion. These concepts are related to a field called 'telephoto-stereo' imaging, where the zoom factor of the lens is adjusted in coordination with the parallax distance of the camera. This could have enormous utility when viewing public events, like sports or concerts, in 3D as it would allow the camera to be located at a remote position while giving the user a much closer effective point of view.

In a similar fashion, the field of 'macro-stereo' imaging makes use of smaller than normal parallax distances to enhance the depth perception of near field objects. The selection of a parallax distance is so important in the field of stereography that a common rule-of-thumb called "the $\frac{1}{30}^{th}$ rule" has been established. It advises that, to get a good stereo effect when imaging a scene, the parallax distance between cameras should be equal to or greater than the distance to the near point of the scene divided by a factor of 30. Since the average interpupillary distance of humans is 63.5 mm, this would suggest that there could be advantages in using a macro-stereo arrangement when viewing objects closer than 1.9 m from the camera.

There may be other instances where it is beneficial to adjust the parallax distance dynamically while capturing a scene. This could be of use in scenes where the objects are moving or the camera operator wants to capture a unique visual effect.

Stereo Imaging for Estimating Depth

When the stereo images are, alternatively, fed to a computer (or other computational platform), triangulation techniques, that are well known by anyone versed in the field, can be used to build up a depth map of the imaged scene.

The use of stereo images to build up a depth map can be enormously helpful in a number of applications. For example, stereo vision can easily solve the common computer vision segmentation problem, which is the ability to separate foreground and background items in a scene. Many monoscopic image processing algorithms devote significant processing resources to solving this problem before commencing with useful 3D vision tasks. With stereo imaging, the segmentation problem is solved directly, significantly reducing the processing required.

In addition, once the depth analysis of a scene is complete, the information could be overlaid with a view of a scene to enhance safety or operational objectives. And the depth information could be overlaid on either a 3D or 2D view of the scene depending on the interests of the end-user. The ability to add this 3D contextual information to any scene would have enormous utility in the field of augmented reality.

There is a vast field of computational stereography where algorithms have been developed in order to back out depth information of a captured scene by triangulating common points in stereo image pairs. It is well known to practitioners in this field that the depth, z, of a point in a scene can be estimated as:

$$z = \frac{fb}{\Delta}$$

where b is the parallax distance between cameras, f is their focal length and $\Delta$ is the disparity, which is the difference in the coordinates of the point of interest in the two images. The sensitivity of the estimated depth to variations in disparity is given by $$\left|\frac{\partial z}{\partial \Delta}\right| = \frac{z^2}{fb}$$

As shown, the parallax distance has a strong effect on the ability to estimate depth. Very large parallax distances can be useful in estimating the depth of distant objects. However, smaller parallax distances might be necessary, for near-field performance.

Variable Parallax Pancam Designs

An apparatus that would allow the parallax distance to change with circumstances will be of great use. Perhaps the simplest example, from everyday life, of a mechanism that would enable the required adjustable parallax functionality is an umbrella. A structure could be realized whereby the act of sliding a support along a central pole could be used to adjust the parallax distance of the digital cameras.

Figure 5:
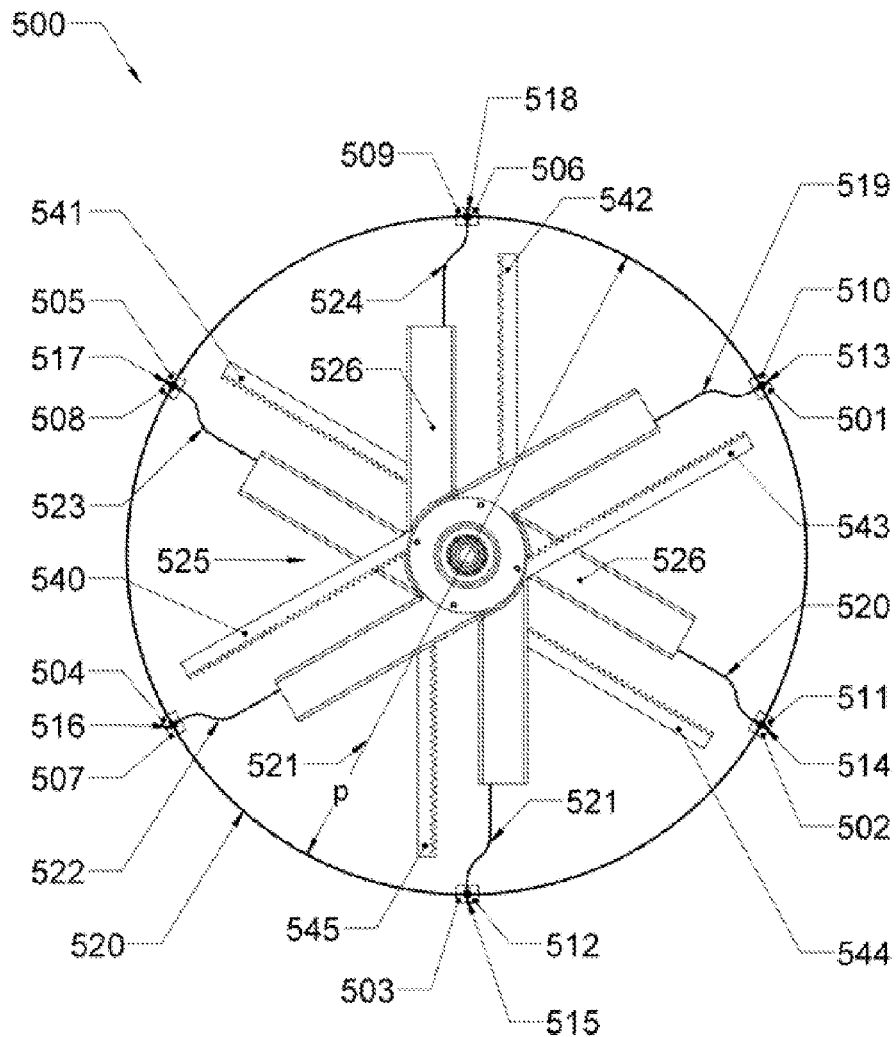
FIG. 5 is a top view of a variable parallax distance, 6-arm camera system design, at a minimum parallax distance configuration in accordance with an embodiment the present invention.

Another, slightly more complex mechanism makes use of a rack and pinion transmission. FIG. 5 is a top view of a variable parallax distance, 6-arm camera system design, at a minimum parallax distance configuration in accordance with an embodiment the present invention. Similar to the Pancam design described in connection with FIG. 2, the variable parallax distance imaging system 500 is composed of 12 separate camera daughter boards, distributed around a circle 520 with a diameter 521 matching a desired parallax distance. The six left-eye camera daughter boards are identified as camera daughter boards 501, 502, 503, 504, 505, and 506 and the six right eye camera daughter boards are identified as camera daughter boards 507, 508, 509, 510, 511, and 512.

As in the idealized designs discussed above, adjacent left- and right-eye camera daughter boards are mounted substantially back-to-back around each mount point 513, 514, 515, 516, 517, and 518. The location of each back-to-back set of camera daughter boards is facilitated through the use of the support brackets 519, 520, 521, 522, 523, and 524. In the preferred embodiment, the camera daughter boards are located as close as possible. However, as is common practice in the field, allowances will be made to allow for adequate thermal relief and to accommodate the logistics of mounting structure and electrical interfaces.

A support structure 525 is employed to position the various camera daughter boards and hold the mechanical transmission used to adjust the configuration. The structure is generally arranged as a central portion with 6 arms extending out in a radial fashion. The structure incorporates a support housing 526, which can be manufactured as one body or composed of multiple parts that assemble together.

Figure 6:
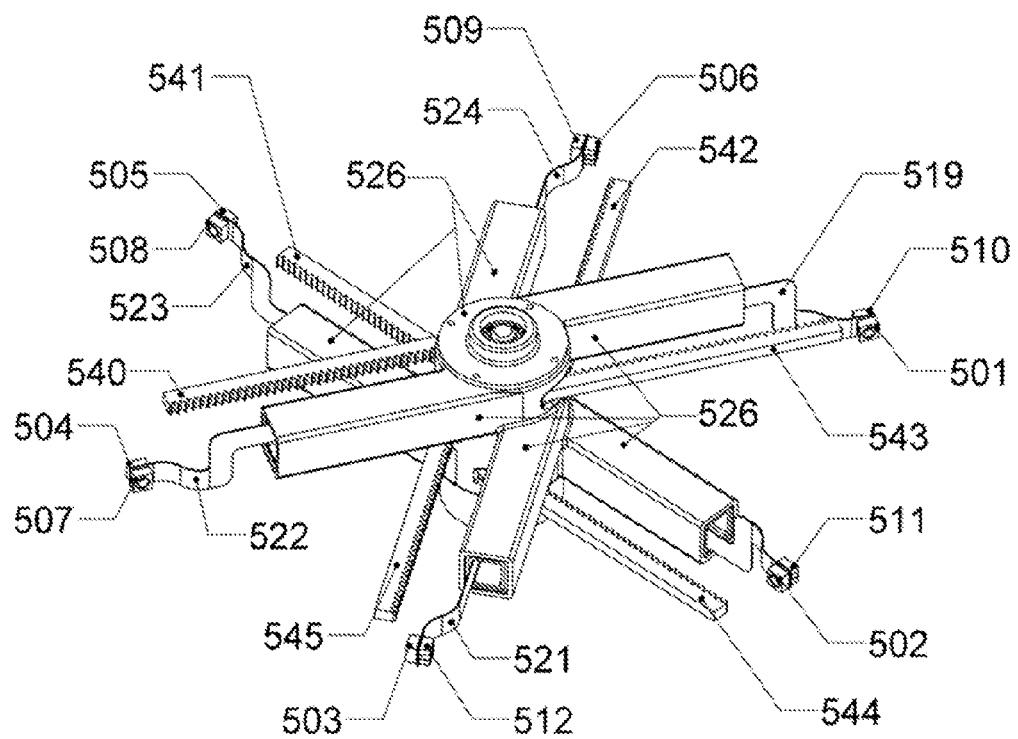
FIG. 6 is an isometric view of a variable parallax distance, 6-arm camera system design, at a minimum parallax distance configuration in accordance with an embodiment the present invention.

FIG. 6 is an isometric view of a variable parallax distance, 6-arm camera system design, at a minimum parallax distance configuration in accordance with an embodiment the present invention. It is the same camera system 500 with most of the same components labeled as in FIG. 5. For clarity, not every component from FIG. 5 is renumbered here. In order to support the rack and pinion logistics, the racks engage a central pinion at three different levels. In the preferred embodiment, the image sensors are positioned in the same horizontal plane. To enable this, support brackets 519 and 522 include an offset in a downward fashion. Symmetrically, support brackets 520 and 523 include an offset in an upward fashion.

Figure 7:
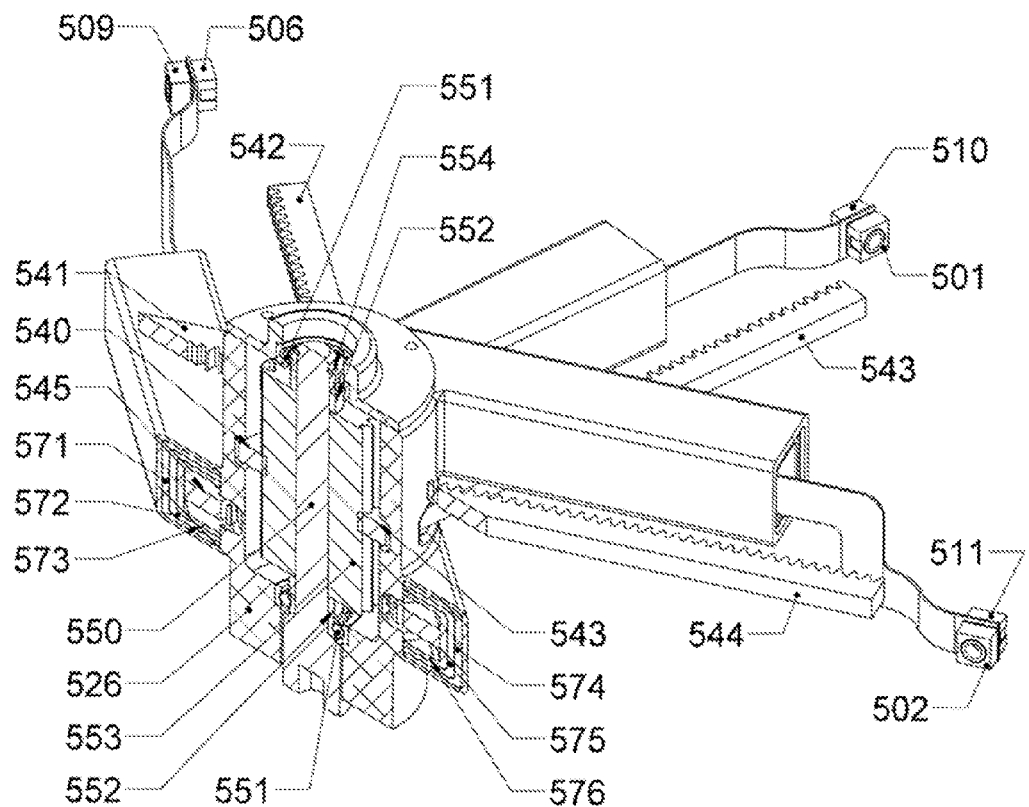
FIG. 7 is a isometric section view of the variable parallax distance, 6-arm camera system design, at a minimum parallax distance configuration, highlighting the rack-and-pinion transmission in accordance with an embodiment the present invention.

FIG. 7 is a isometric section view of a the variable parallax distance, 6-arm camera system design, at a minimum parallax distance configuration, highlighting the rack-and-pinion transmission in accordance with an embodiment the present invention. A pinion gear 553 is mounted to a central shaft 550 in a fashion that is common in the art, such that it is fixedly coupled to the shaft and they move as one body. (A key (not shown) is used in this embodiment.) The shaft is supported above and below the pinion by roller bearings 551. Shaft spacers 552 are also incorporated to ensure proper clearance. A retaining ring 554 is included to help maintain axial position of components on the shaft. As the shaft is rotated, the pinion 553 engages each of the racks 540, 541, 542, 543, 544, and 545 in an identical fashion.

Inside of each arm of the support housing 526 is a telescoping arm, composed of three elements, an inner, middle and outer element. Each rack is solidly fixed to the minimum radius end of the inner element of its corresponding telescoping arm. So, in the figure, rack 542 is solidly fixed to the minimum radius end of the inner telescoping arm element 576. As the pinion turns, it pushes the rack 542 which in turn extends the inner element in an outwardly radial direction. The inner element is free to slide with respect to the middle element 575 of the telescoping arm up until it reaches a mechanical limit with the middle element. Further rotation of the pinion then pushes both the inner and middle elements of the telescoping arm outward. The middle element is free to slide with respect to the outer element 574 of the telescoping arm up until it reaches a mechanical limit with the outer element. In this design, the outer element is fixedly mounted to the support housing 526 for general support and is not designed to move. The support bracket 521 (see FIG. 6) is solidly fixed to the maximum radius end of the inner telescoping arm element 576. Thus, as the rack 542 is adjusted by the pinion 553, the telescoping arms (574, 575, 576) operate to extend the parallax offset of camera daughter boards 503 and 512.

An identical mode of operation occurs between the pinion 553 and each rack and telescoping arm structure. Rack 545 and the telescoping elements 573, 572, and 571 that connect to support bracket 524 and camera daughter boards 506 and 509 are also illustrated in FIG. 7.

The above is one possible telescoping arm embodiment. But any telescoping arm design, as is known in the art, would work. Through this transmission, the radial position of all camera daughter boards can be extended or retracted in an identical manner and a variable parallax distance realized.

Anti-backlash techniques could also be employed to minimize the effect that excess clearances would have on maintaining accurate radial positioning of each imager. The shaft could be coupled to a motor, hand crank or any other transmission element that could affect the rotational operation of the pinion. These additional transmission elements are not shown but would be obvious to anyone skilled in the art.

Figure 8:
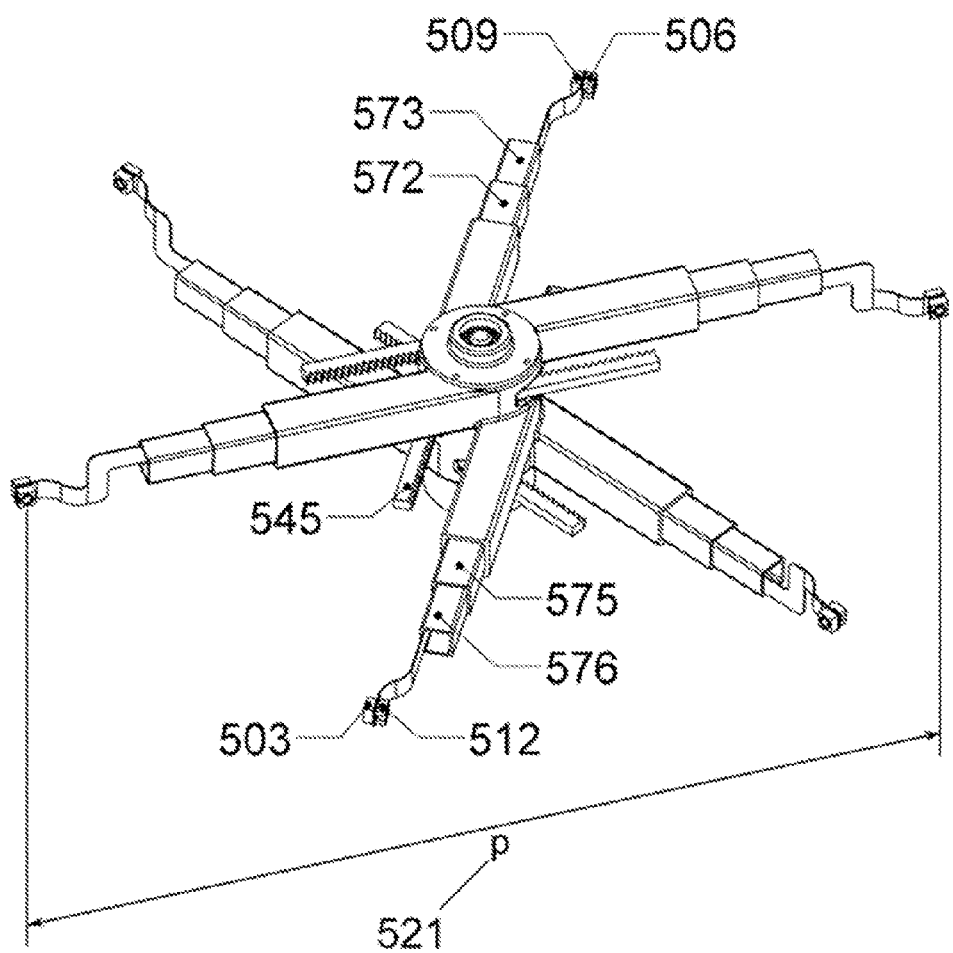
FIG. 8 is an isometric view of a variable parallax distance, 6-arm camera system design, at an intermediate parallax distance configuration in accordance with an embodiment the present invention.

FIG. 8 is an isometric view of a variable parallax distance, 6-arm camera system design, at an intermediate parallax distance configuration in accordance with an embodiment the present invention. This is the resulting configuration of the camera design of FIG. 5-FIG. 7 upon operating the shaft and pinion to extend the parallax distance part-way. In this configuration, the inner and middle elements of each telescoping arm are visible. Thus, camera daughter boards 506 and 509 are supported by inner telescoping element 573 and middle telescoping element 572. Similarly inner and middle telescoping elements 576 and 575 support camera daughter boards 503 and 512. The process is the same for the other four arms such that all of the arms extend in an identical manner, resulting in a uniform change in the parallax distance, p, 521.

Figure 9:
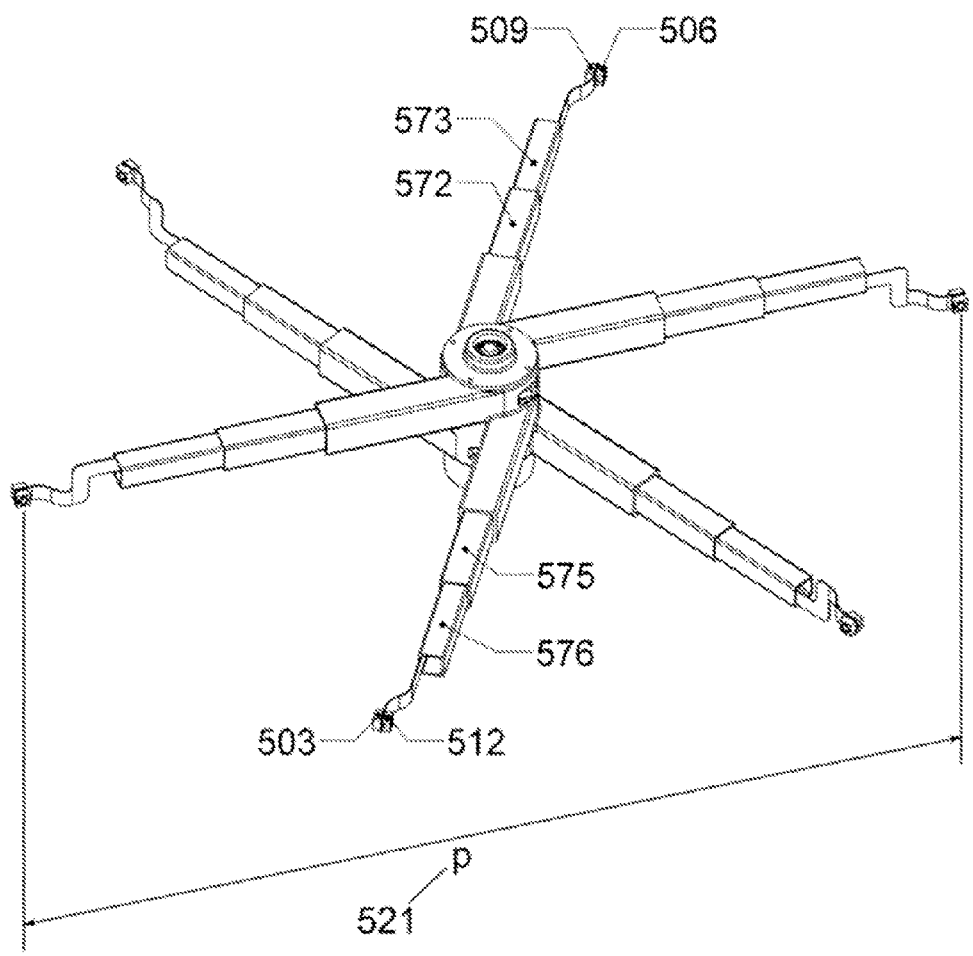
FIG. 9 is an isometric view of a variable parallax distance, 6-arm camera system design, at a maximum parallax distance configuration in accordance with an embodiment the present invention.

FIG. 9 is an isometric view of a variable parallax distance, 6-arm camera system design, at a maximum parallax distance configuration in accordance with an embodiment the present invention. Similar to FIG. 8, this illustrates the resulting configuration upon rotating the shaft and pinion a maximum amount, such that the telescoping arms are maximally extended. Again, the inner and middle elements of each telescoping arm are clearly exposed and the camera daughter boards enjoy a maximum parallax distance, p, 521.

Figure 10:
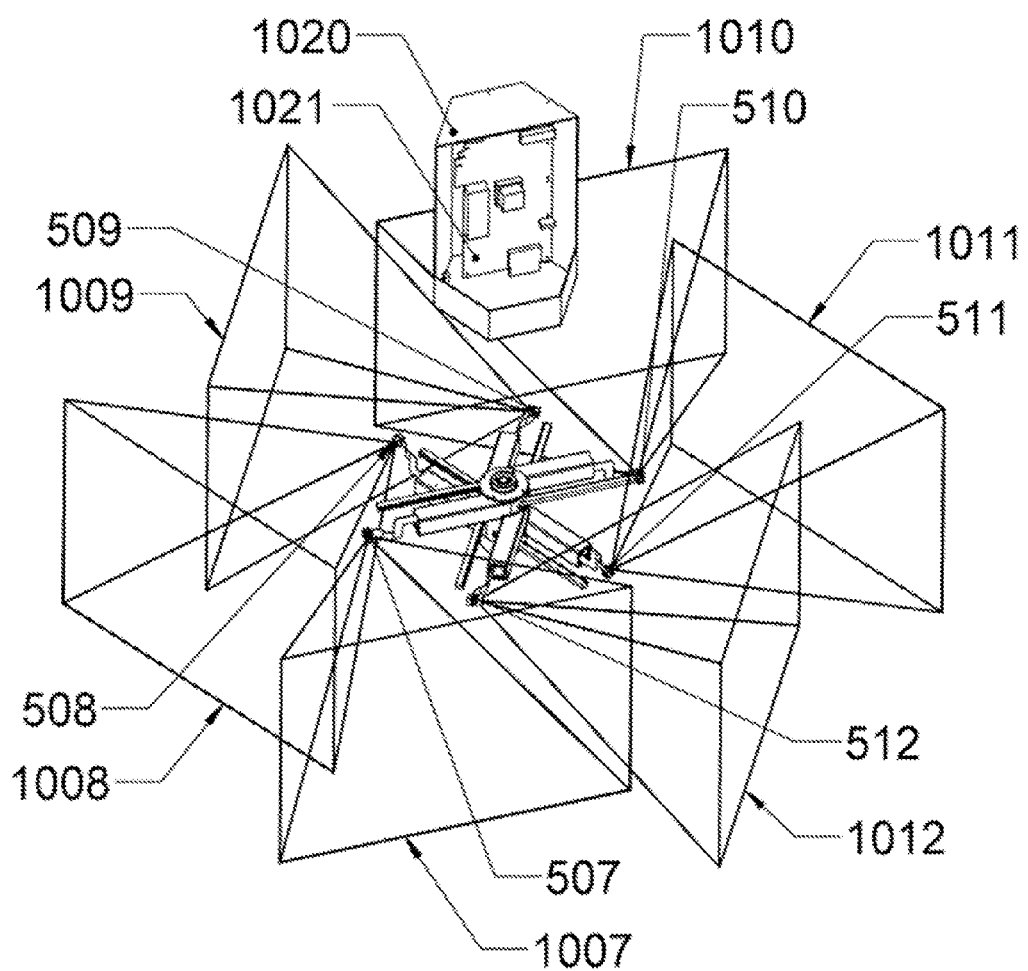
FIG. 10 is an isometric view of a variable parallax distance, 6-arm camera system design, at a minimum parallax distance configuration with viewing frustums for each of the right eye camera daughter boards and showing a central electronics component located above the imaging structure in accordance with an embodiment the present invention.

FIG. 10 is an isometric view of a variable parallax distance, 6-arm camera system design, at a minimum parallax distance configuration with viewing frustums for each of the right eye camera daughter boards and showing a central electronics component located above the imaging structure in accordance with an embodiment the present invention. A central processing set of electronics is needed to collect the image streams from all of the camera daughter boards and stitch together the final panoramic 3D result. FIG. 10 illustrates the placement of an electronics support structure 1020 in proximity to the camera structure. A section cut has been made to show the central processing electronics 1021 that would be mounted inside this structure 1020. This structure can either be connected directly to the camera support structure 526 or mounted separately. In the preferred embodiment, a wired electrical interface, using serial data transfer, will be routed from each camera daughter board to the central processing electronics. A separate discussion is provided below to describe the types of processing tasks that may be completed on this central processing hub.

FIG. 10 also shows the viewing frustums 1007, 1008, 1009, 1010, 1011, and 1012 that correspond to the 6 right-eye camera daughter boards 507, 508, 509, 510, 511, and 512, respectively. As shown, a convenient location in space exists just above (or below) the camera structure at which the electronic support structure 1020 can be mounted without obscuring any of the viewing frustums.

In practice, the shaft can be adjusted in an analog fashion resulting in an operational parallax distance 521 of any value between the minimum and maximum distances allowed by the mechanics of the system. For example, embodiments of the invention could be made smaller or larger than the design illustrated above. The sizes of components used in this figure were selected for illustrative purposes only. A much larger version of this system could be used to enable hyper-stereo applications. For example, mounting the system to a Naval vessel or a military aircraft to better search for and identify threats. Miniature designs could also be realized to adjust the parallax distance at or below distances matching the human interpupillary distance. Applications of this technology are discussed in more depth below.

A rack-and-pinion transmission was illustrated in the above figure since it provides a dramatic illustration of the variable parallax distance principle. However, embodiments of this invention are not restricted to gear based designs. For example a fluidic solution (using hydraulics or pneumatics) could be used to control the radial support location. In fact, a fluidic solution might be ideal for designs that require a large change in parallax distance since it avoids the use of a solid structure, like a rack, to facilitate a purely mechanical solution. For example, the rack lengths in the above design limit the extent to which the parallax distance can be adjusted, since the racks can impinge on the viewing frustums of oppositely mounted camera daughter boards when at a minimum parallax configuration, as illustrated in FIG. 5. In a fluidic solution, hydraulics or gas could be piped in from above or below in order to extend the arm length by way of valves and an actuating piston, as would be obvious by one skilled in the art.

Almost any actuation technology could be used to drive the adjustment. This includes linear motors, power screws, magnetic or electrostatic devices. Active material solutions are also possible. For example, there are a wide variety of piezoelectric, electrostrictive, magnetostrictive, or ferromagnetic ceramic or shape memory alloy actuation technologies that could be used in so-called single stroke, or multi-stroke (inchworm) type designs. In fact, quite sophisticated position control schemes, using feedback and feed-forward control techniques, could be employed to tune the actuated length of each camera arm separately or the set of arms as a group.

Extended Elevation Variable Parallax Distance

Figure 11:
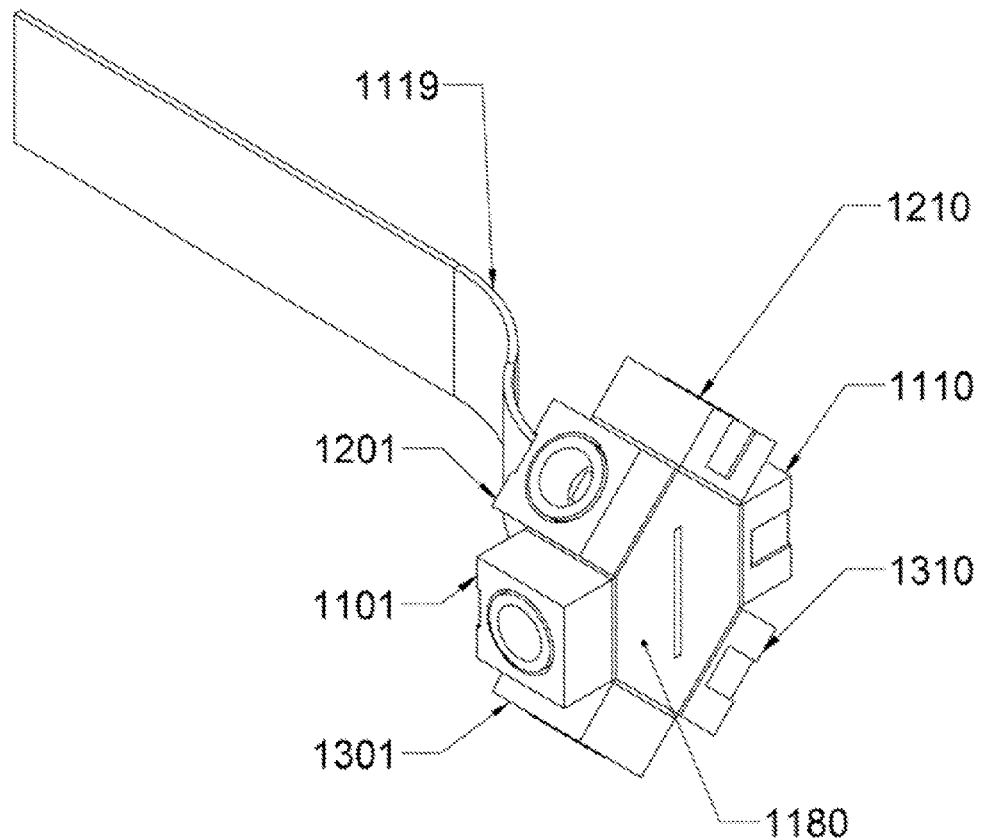
FIG. 11 is a view of an extended elevation camera bracket structure with three right eye camera daughter boards and three left eye camera daughter boards in accordance with an embodiment the present invention.

FIG. 11 is a view of an extended elevation camera bracket structure with three right eye camera daughter boards and three left eye camera daughter boards in accordance with an embodiment the present invention. FIG. 12 is a zoomed out image of the extended elevation camera arm structure of FIG. 11 that includes wire frame viewing frustums for the camera daughter boards highlighting the extended vertical field of view coverage. This camera bracket mount structure can be used to enable extended elevation embodiments of the variable parallax distance design. A camera support bracket 1119 interfaces with a multi-elevation mounting fixture 1180. This fixture orients three camera daughter boards 'per-eye' (NO) such that the vertical fields of view of their viewing frustums overlap by a small amount. The main difference with the in-plane design is that whereas the optical axes were tangent to a parallax circle for the in-plane design, now the optical axes of all cameras are substantially tangent to a 'parallax cylinder'.

Figure 12:
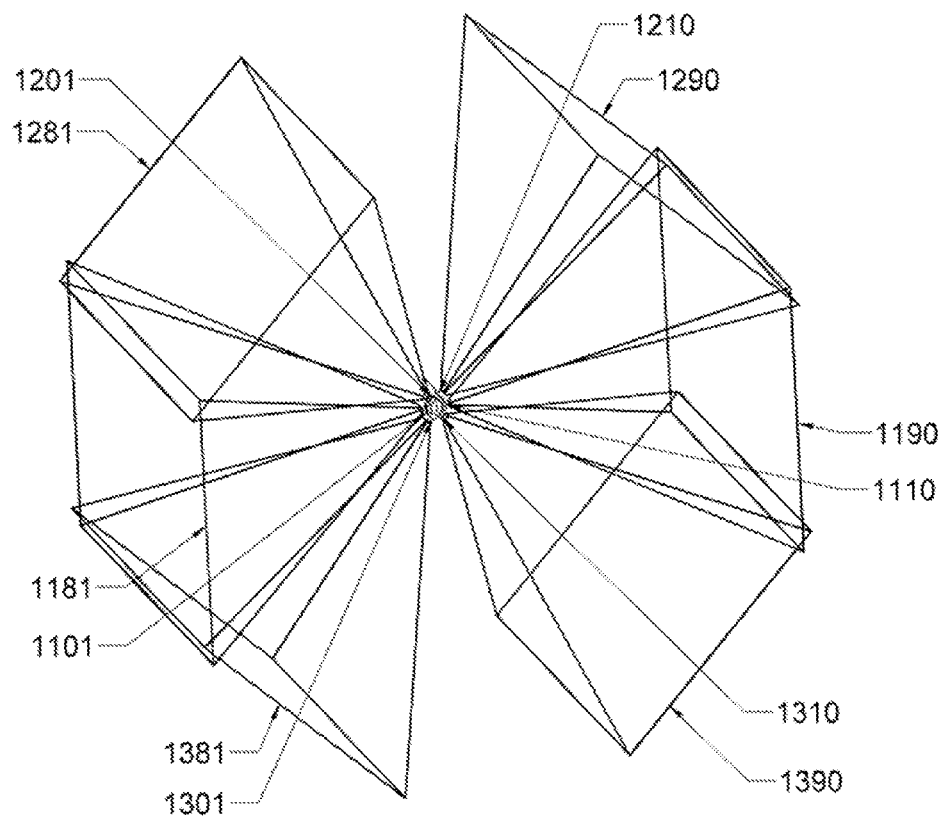
FIG. 12 is a zoomed out image of the extended elevation camera arm structure of FIG. 11 that includes wire frame viewing frustums for the camera daughter boards highlighting the extended vertical field of view coverage in accordance with an embodiment the present invention.

In FIG. 11 and FIG. 12, camera daughter board 1101 has a similar function to camera daughter board 501 in FIG. 5. Camera daughter board 1101 images the scene through viewing frustum 1181. Camera daughter board 1201, with viewing frustum 1281, is added to extend the vertical field of view above the horizon. Camera daughter board 1301, with viewing frustum 1381, is added to extend the vertical field of view below the horizon. In this particular design, the vertical field of view of each digital camera is approximately 50°. The mounting fixture 1180 is designed with 45 degree angled faces to deliver an approximately 5° overlap in the vertical fields of view of neighboring cameras.

In a similar manner, camera daughter boards 1110, 1210 and 1310 provide an extended elevation view for the right eye through viewing frustums 1190, 1290, and 1390, respectively. Again, the viewing frustums overlap by a small amount to ensure no blind spots and to help with stitching the scenes vertically. Such an arrangement allows the realization of an extended vertical field of view at a high resolution and with minimal distortion.

Figure 13:
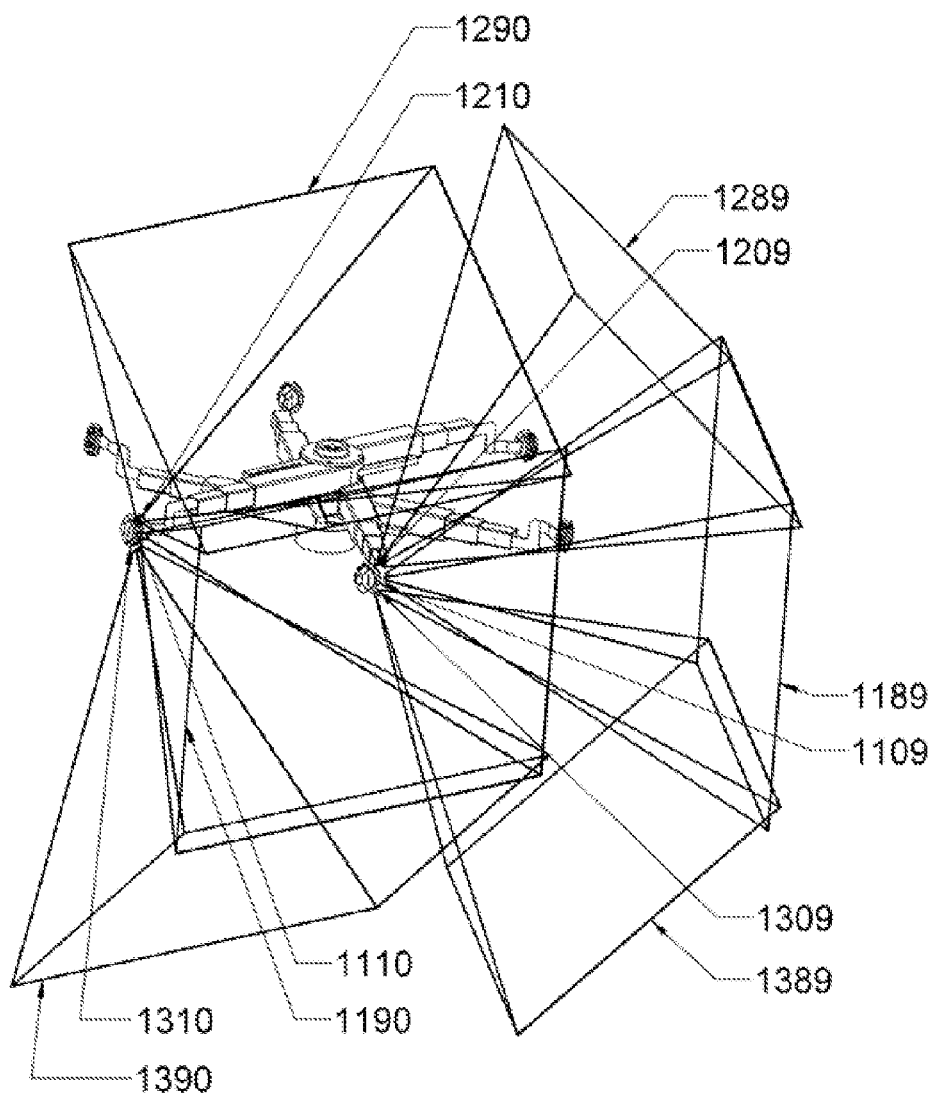
FIG. 13 is an isometric view of a variable parallax distance, 6-arm, extended elevation camera system design, at an intermediate parallax distance configuration. Wire frame frustums for the three right-eye camera daughter boards at the end of two of the arms are illustrated to highlight how the frustums cooperate to provide extended elevation performance in accordance with an embodiment the present invention.

FIG. 13 is an isometric view of a variable parallax distance, 6-arm, extended elevation camera system design, at an intermediate parallax distance configuration in accordance with an embodiment the present invention. Wire frame frustums for the three right-eye camera daughter boards at the end of two of the arms are illustrated to highlight how the frustums cooperate to provide extended elevation performance. The platform is shown extended mid-way, but the concept is valid for any selected parallax distance value. As shown, right eye camera daughter boards 1110, 1210 and 1310 are imaging the scene through viewing frustums 1190, 1290, and 1390. In a similar fashion, camera daughter boards 1109, 1209 and 1309 are imaging the scene through viewing frustums 1189, 1289, and 1389.

This multi-elevation design realizes a variable parallax distance in an identical fashion to that described in the in-plane design. As an internal pinion is rotated, the arms of the design extend or contract resulting in a variable parallax distance functionality.

Alternate Embodiments-8 Camera Design

Figure 14:
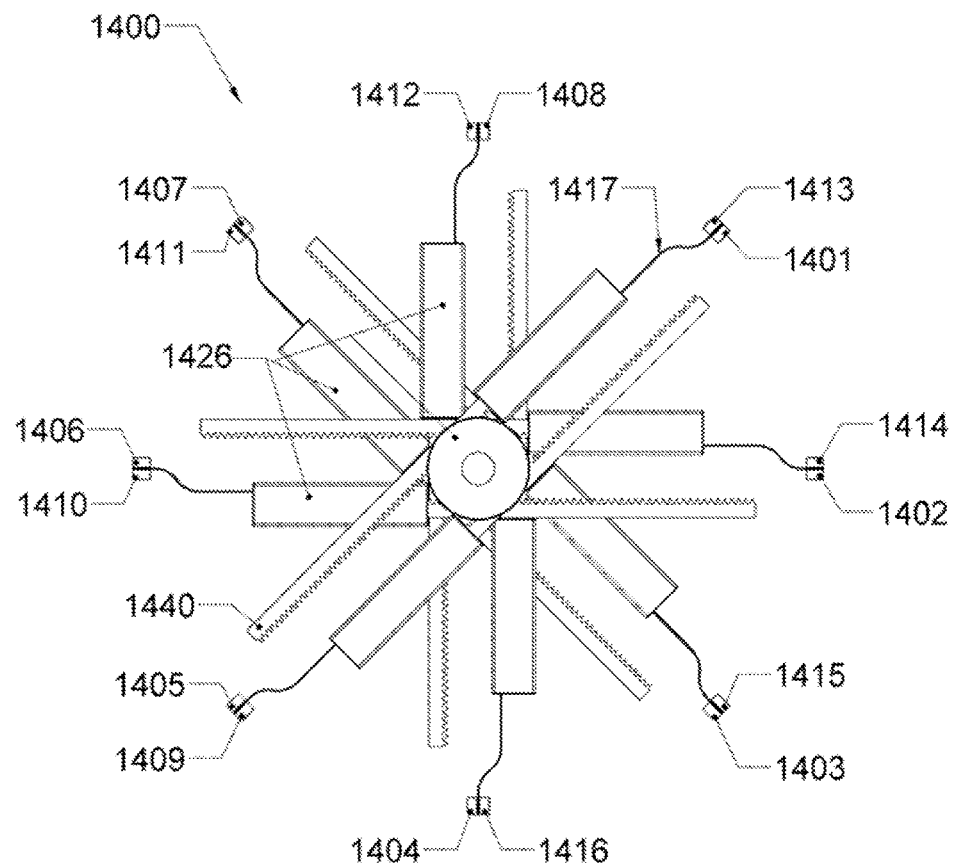
FIG. 14 is a top view of a variable parallax distance, 8-arm camera system design, at a minimum parallax distance configuration in accordance with an embodiment the present invention.

FIG. 14 is a top view of a variable parallax distance, 8-arm camera system design, at a minimum parallax distance configuration in accordance with an embodiment the present invention. This figure is included to show that embodiments can be realized with an arbitrary number of arms. The operative philosophy of the design still governs. In the embodiment illustrated, there are 8 left-eye camera daughter boards 1401, 1402, 1403, 1404, 1405, 1406, 1407, and 1408 and 8 right-eye camera daughter boards 1409, 1410, 1411, 1412, 1413, 1414, 1415, and 1416. As with the six-camera design, the camera daughter boards are located near mount points at the ends of 8 arms through the use of telescoping components, rack transmissions and support brackets. For example, camera daughter boards 1401 and 1413 are mounted to support bracket 1417, which interfaces to the outer end of a telescoping arm mounted to the support housing 1426. The rack 1440 engages with a pinion gear which is not visible. Operation proceeds in a substantially similar fashion as that described in the h-armed Pancam embodiment described above. An identical mounting architecture is used for the other 7 arms of this design.

Alternate embodiments can be realized that duplicate the multi-elevation design described above or that represent wide field-of-view scenes of less than 360 degrees or even designs where arms of the camera design may be eliminated for logistical or operational reasons. An example of this would be when mounting one of these cameras against the side of a building.

Selectable Parallax Distance Pancam Design

There would be significant utility in a camera system able to stereoscopically monitor an entire wide field-of-view area through the use of multiple parallax distances, simultaneously and without any moving parts. Such a system would deliver numerous benefits over designs that rely on moving components to adjust parallax distance. These include simultaneous capture of the scene, reduced cost and fewer maintenance issues.

Figure 15:
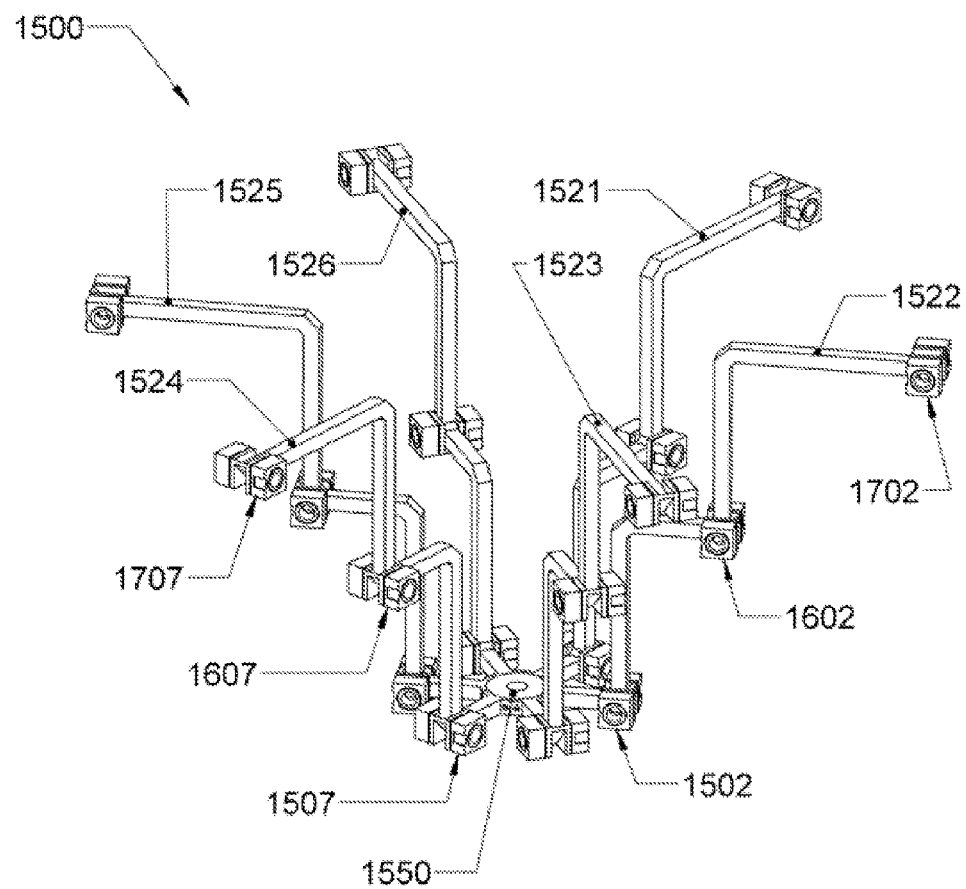
FIG. 15 is an isometric view of a selectable parallax distance, 6-arm camera system design in accordance with an embodiment the present invention.

FIG. 15 is an isometric view of a selectable parallax distance, 6-arm camera system design in accordance with an embodiment the present invention. This Pancam design 1500 arranges three groups of digital cameras, defined as 'supersets', to capture a wide field of view scene, stereoscopically, using three different parallax distances. In this particular embodiment, the three parallax distances were chosen to be 1×, 2× and 4× the interpupillary distance of a human, 63.5 mm. Thus, the camera daughter boards are oriented around three constructive, concentric cylinders (not shown) with diameters of 63.5 mm, 127 mm, and 254 mm. In practice, any parallax distances and any number of supersets of digital cameras could be used. For example, the supersets could have the same parallax distance.

The supersets are mounted through the use of six contoured arms 1521, 1522, 1523, 1524, 1525, and 1526. The arms are mounted at one end to a central hub 1550 and rise along a desired trajectory. At specific radial locations along the arms, left- and right-eye camera daughter boards are adjacently mounted to each arm by a mounting bracket (these brackets are shown in the figure but not specifically identified with a number).

Figure 16:
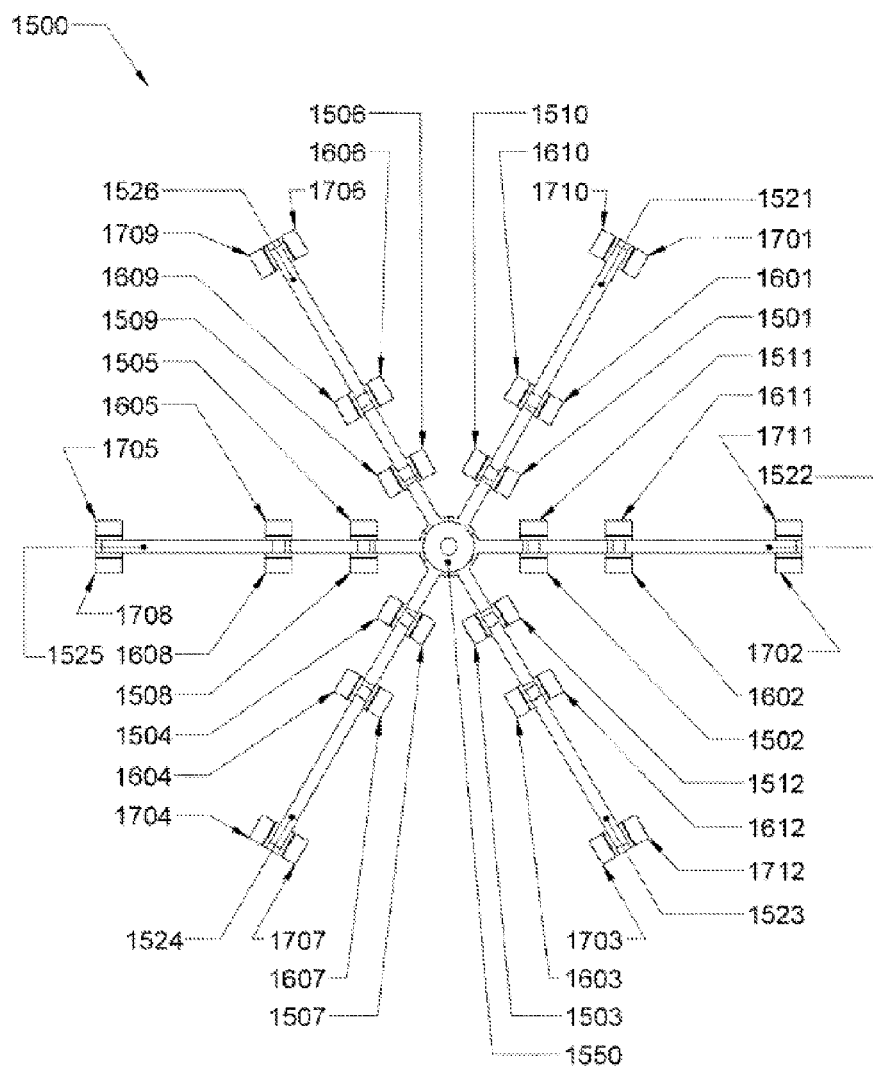
FIG. 16 is a top view of the selectable parallax distance, 6-arm camera system design of FIG. 15.

FIG. 16 is a top view of the selectable parallax distance, 6-arm camera system design of FIG. 15. This figure is used to more clearly identify the camera daughter board supersets in this embodiment.

At a minimum parallax distance, a first superset of cameras is located. Six left-eye camera daughter boards 1501, 1502, 1503, 1504, 1505, and 1506 are identified in this superset. Six right-eye camera daughter boards 1507, 1508, 1509, 1510, 1511, and 1512 are similarly identified.

At a second parallax distance, a second superset of cameras is located. Six left-eye camera daughter boards 1601, 1602, 1603, 1604, 1605, and 1606 are identified in this superset. Six right-eye camera daughter boards 1607, 1608, 1609, 1610, 1611, and 1612 are similarly identified.

At a maximum parallax distance, a third superset of cameras is located. Six left-eye camera daughter boards 1701, 1702, 1703, 1704, 1705, and 1706 are identified in this superset. Six right-eye camera daughter boards 1707, 1708, 1709, 1710, 1711, and 1712 are similarly identified.

Figure 17:
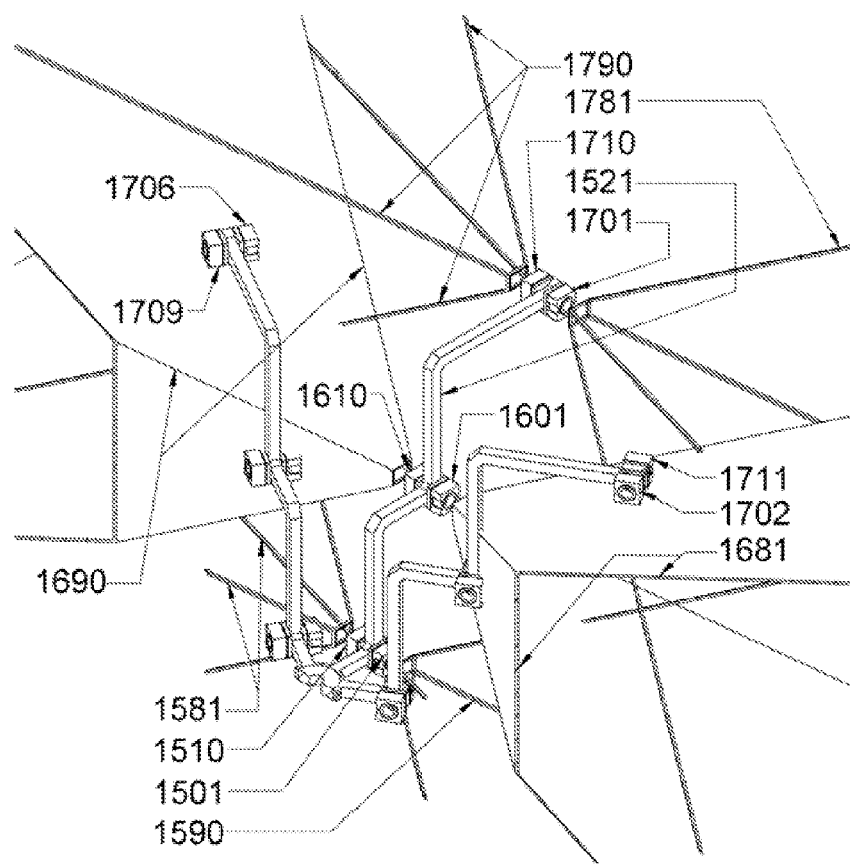
FIG. 17 is an isometric section view of a selectable parallax distance, 6-arm camera system design in accordance with an embodiment the present invention. Wire frame frustums are drawn to highlight how the arms are contoured to minimize obscuration between camera supersets.

FIG. 17 is an isometric section view of a selectable parallax distance, 6-arm camera system design in accordance with an embodiment the present invention. Constructive wire frame and solid viewing frustums are drawn for the camera daughter boards of one arm to highlight how, in the preferred embodiment, the arms are contoured to minimize obscuration between camera supersets. Wireframe viewing frustums 1581, 1590, 1781, and 1790 are drawn for the minimum parallax distance camera daughter boards 1501 and 1510 and the maximum parallax distance camera daughter boards 1701 and 1710, respectively. Solid viewing frustums 1681 and 1690 are drawn for the intermediate parallax distance camera daughter boards 1601 and 1610, respectively. These solid frustums are drawn to highlight how the contour of the arm is such that none of the camera daughter boards from neighboring supersets of neighboring arms pierce these solid frustums. For example, camera daughter boards 1702, 1706, 1709, and 1711 are preferably positioned so as to not enter the viewing frustums 1681 and 1690.

Embodiments that allow obscuration between arms and camera daughter boards of neighboring supersets are possible. In these cases, techniques similar to those discussed above for dealing with in-plane obscuration can be employed to manage the obscuration. Specifically, the user could be expected to process out (i.e. ignore) the obscuration. Alternatively, advanced processing could be used to mask out the presence of these components using feeds from forward cameras, as described before.

As with the variable Pancam design, a central set of electronics will also be used and preferably mounted in a manner similar to that shown for the design illustrated in FIG. 10.

Extended elevation versions of the selectable-parallax distance camera can also be realized by combining a camera daughter board arrangement similar to FIG. 11 with an architecture similar to that shown in FIG. 15. However, as the vertical field of view of the effective frustums is extended, the vertical separation between the camera supersets will also preferably increase to avoid obscuration between cameras from neighboring supersets. This can lead to longer, more cumbersome and structurally complex contoured arm members.

Figure 18:
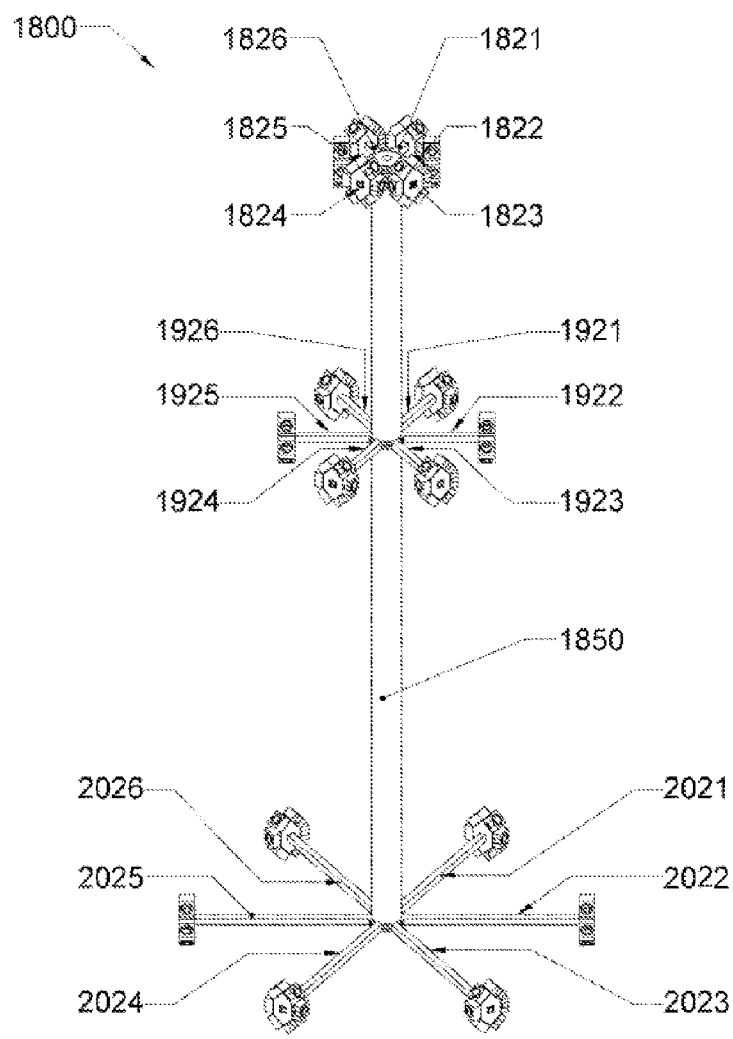
FIG. 18 is an isometric view of a selectable parallax distance, 18-arm extended elevation camera system design composed of multiple levels of camera supersets with different parallax distance values in accordance with an embodiment the present invention.

FIG. 18 is an isometric view of a selectable parallax distance, 18-arm extended elevation camera system design composed of multiple levels of camera supersets with different parallax distance values in accordance with an embodiment the present invention. This design is able to capture a scene from multiple parallax distances, simultaneously, as in the previously described design. It also includes the added benefit that each arm can be mounted to a single vertical base structure at the center, which is less complex, structurally. As with the design illustrated in FIG. 15-FIG. 17, there are three supersets of cameras at parallax distances at 1×, 2×, and 4× the average human interpupillary distance. However, now there are 18 arms instead of 6. In addition, at the end of each arm, instead of just one left and one right eye camera daughter board, a camera fixture similar to that illustrated in FIG. 11 is used to enable a much greater effective vertical field of view.

All of the arms of the camera are now mounted to a single base pole 1850. The minimum, 63.5 mm, parallax distance supersets are supported by six arms 1821, 1822, 1823, 1824, 1825, and 1826. The intermediate, 127 mm, parallax distance supersets are supported by six arms 1921, 1922, 1923, 1924, 1925, and 1926. The maximum, 254 mm, parallax distance supersets are supported by six arms 2021, 2022, 2023, 2024, 2025, and 2026.

Figure 19:
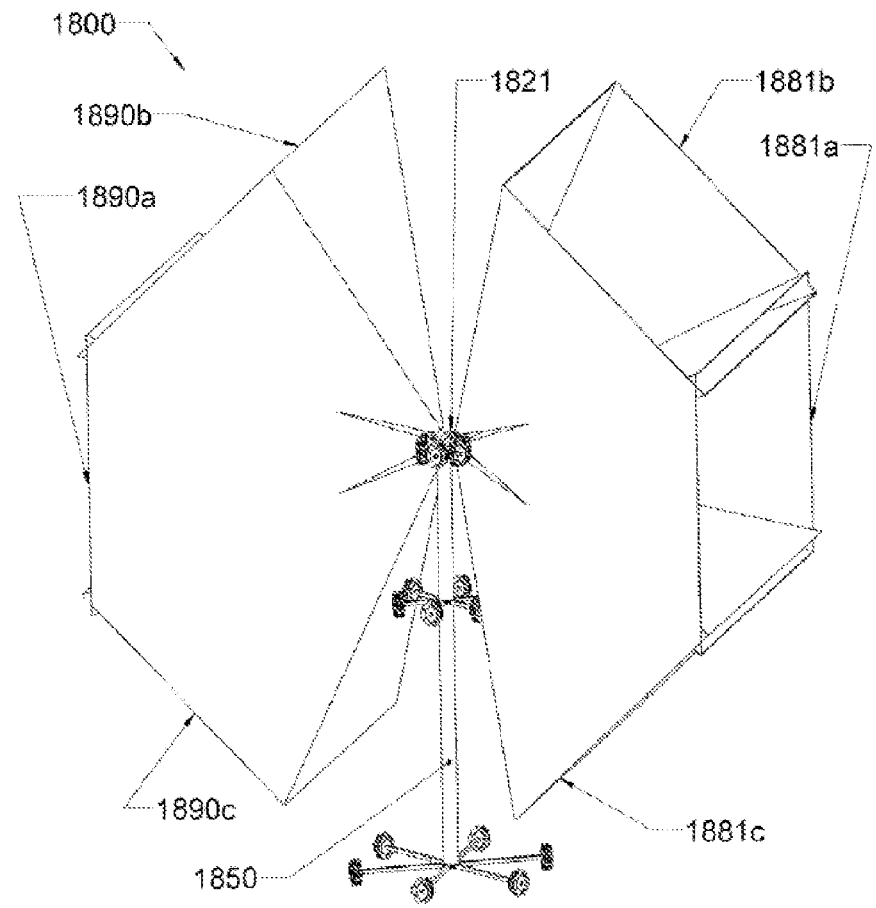
FIG. 19 is an isometric view of the camera system of FIG. 18 with solid viewing frustums drawn for six minimum parallax distance camera daughter boards to highlight the design placement to minimize obscuration between camera supersets.

FIG. 19 is an isometric view of the camera system of FIG. 18 with solid viewing frustums drawn for six minimum parallax distance camera daughter boards to highlight the design placement to minimize obscuration between camera supersets in accordance with an embodiment the present invention. As shown, in this extended elevation embodiment, the vertical spacing for the arms is bigger than for the in-plane design of FIG. 15 to ensure the camera daughter boards stay out of the viewing frustum of the other supersets. The most stringent constraint on this is posed by the maximum parallax distance superset, in connection with the viewing frustums of the minimum parallax supersets. This is illustrated in the figure, where the viewing frustums from the six camera daughter boards at the end of the minimum parallax distance arm 1821 are drawn as solid structures. The three left-eye viewing frustums are identified as 1881a, 1881b, and 1881c. The three right-eye viewing frustums are identified as 1890a, 1890b, and 1990c. As shown, the length of the pole 1850 and the placement of the neighboring supersets are preferably chosen to keep their camera daughter boards out of the minimum parallax distance viewing frustums in order to avoid obscuration between supersets.

Summary of Selectable Parallax Distance Benefits

There are significant benefits of simultaneously capturing the same scene from the perspective of multiple parallax distances. The selectable capability will come into play as a user consumes the video captured by the system. Since all cameras are capturing the entire scene at all times, the user has the capability to choose which parallax distance feed to observe.

Specialized configurations of the system could also be developed where the optical settings (zoom, aperture, etc) of the various parallax distance supersets could be adjusted to give a unique alternative view of the scene. For example, if a camera system like this was used to capture a live event, the shorter parallax distance could be used for general observations whereas the larger parallax distance supersets could be equipped with zoom lenses to provide 'up-close, zoomed, 3D images' for more immersive views of the action. All feeds could be recorded on a circular buffer and the user would have the capability to select (and review) the video feed that most effectively captured the unfolding events. This would offer a kind of enhanced 'instant replay' functionality. A more detailed example of how a system like this might be used is described in the Applications section, below.

Other embodiments of this camera can be realized. For example, any sequence of arms could be selected along the pole. Also, as discussed for the variable parallax distance structure, designs with non-uniform arm spacing and/or designs that make use of digital cameras with a variety of performance specifications can all be considered valid embodiments of the invention.

In addition, combinations of the above embodiments are possible. For example, a camera system with multiple camera supersets, statically located, in combination with a variable parallax distance design (similar to that described in connection with FIG. 5) could also be realized. A static parallax distance matching the human interpupillary distance could be used for general observation of a scene while a variable parallax distance superset could be used to selectively zoom in and observe or analyze elements of the scene as desired.

Figure 25:
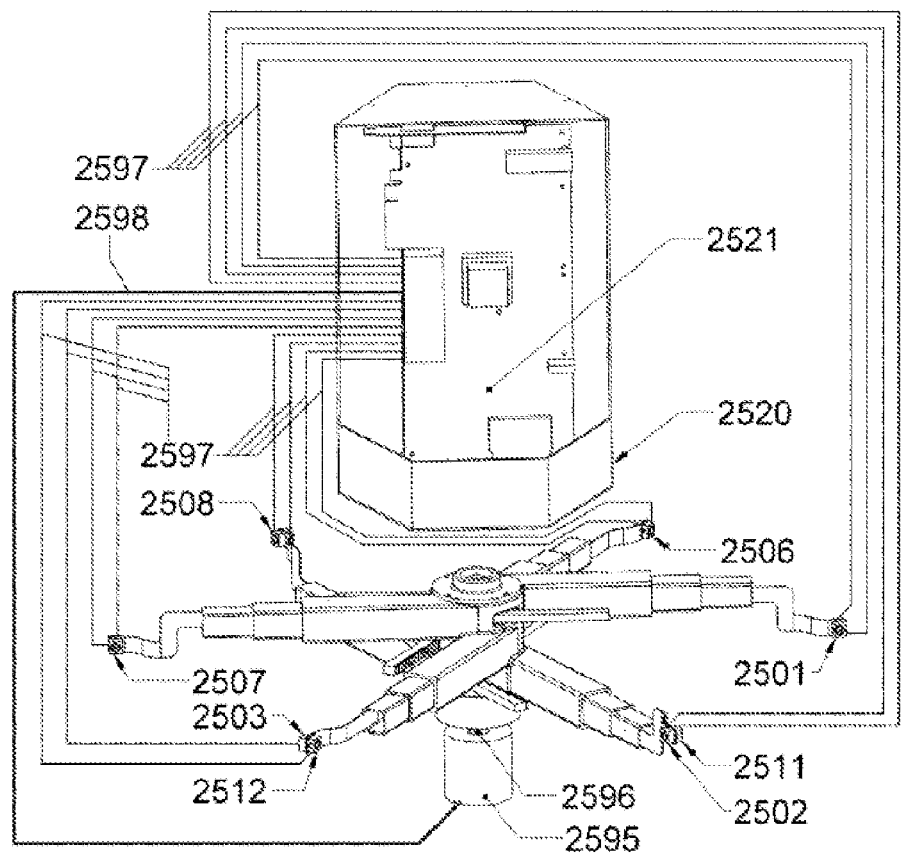
FIG. 25 illustrates a 6-arm, rack and pinion, variable parallax design with attached drive motor and control electronics in accordance with an embodiment the present invention.

FIG. 25 illustrates a 6-arm, rack and pinion, variable parallax design with attached drive motor and control electronics in accordance with an embodiment the present invention. This figure illustrates how the parallax distance could be adjusted in concert with the optical settings of the camera. This kind of arrangement could be used as a stand-alone camera system or as one of the supersets in the selectable parallax designs described above. The camera system incorporates six arms with 12 digital camera daughter boards 2501-2512 (not every daughter board is labeled) in a design identical to that described in relation to FIG. 5-FIG. 10. Also shown is a drive motor 2595 that couples to the bottom of the main shaft and pinion gear (both not shown) through a coupling interface 2596. A central set of electronics 2521 is housed in an electrical housing 2520. These electronics interface with one or more of the camera daughter boards through control wires 2597. In a similar fashion, a motor control interface 2598 is wired between the drive motor and the control electronics. In this embodiment, the control electronics would operate to adjust the camera operational settings (such as zoom level, gain, aperture, etc.) in concert with the drive motor to adjust the parallax distance to achieve a desired optical effect.

In a following section, a variety of applications are described in which the variable parallax distance and/or selectable parallax distance designs can enable new levels of performance.

Multi-Camera Image Processing Architectures

One important requirement of nearly all multi-camera imaging arrays is the use of a relatively powerful image processing platform to synthesize the usable output image stream. Some designs require more processing than others.

Data processing for the system proceeds as follows. Data capture initiates on the image sensor where frames of pixel data are captured at an established sampling frequency and output from the device. After that point, the following processing operations may occur in any particular order (all of the processing steps are not required to realize a usable image stream): color reconstruction (often called demosaicing), stitching, blending, compression/decompression, memory encoding/decoding, as well as other processing steps. In the preferred embodiments, the output of the overall camera system is some form of data stored to non-volatile memory and/or images sent to some kind of 2D or 3D display technology. Each of these processes is described next.

Data Capture

The preferred camera architecture is composed of multiple camera daughter boards, on which each digital camera operates. These cameras can operate independently. However, to minimize any undesired artifacts (like 'tearing') between stitched images of a scene, especially when capturing scenes with rapidly changing, dynamic content, it is preferable to synchronize the frame capture of all cameras. For example, if each camera is operating independently at 60 FPS, the frame trigger points between any two cameras can differ by as much as 8.3 ms. However, by employing a 'shutter trigger signal', initiated by the central boards and radiating out to each digital camera, the trigger points can be synchronized to within one period of a governing clock signal, which can typically operate at speeds of 40 MHz or higher. Using techniques common in the art, frame synchronization of 10's of nanoseconds or faster are possible, if necessary.

After the pixel data is read from the image sensor, local image processing can optionally be performed on each daughter board prior to transmitting the data to the central hub. Local processing can yield significant benefits in overall system speed and power as it more fully distributes processing over the entire camera architecture.

Data Transfer Strategies

It is possible to build a single set of integrated electronics that house both the individual digital cameras and the central processing components. However, the preferred embodiment employs separate camera daughter boards to capture and transmit the data to a central hub. This kind of architecture is preferred because it is more fault tolerant and more easily accommodates the swap-out of daughter boards for repair or system upgrades.

Many communication standards and formats could be used to transfer the data, such as wired or wireless transfer and serial or parallel data formats. Because of the data capture speeds involved, the preferred embodiment would use a wired, serial transfer communication mechanism. Serial data transfer is preferred over parallel transfer because fewer conductors are required (which helps to minimize the size of components) and there is less risk of data corruption due to timing variations between parallel paths. These advantages allow the transfer of data over relatively long serial paths at much higher frequencies than in parallel implementations.

Data transfer speeds are of critical importance in multi-camera designs. For example, OmniVision OV02724 image sensors require data transfer rates of up to 1600 mega-bits-per-second (Mbps) per sensor. The data rates can be even higher if demosaicing is performed on-board the image sensor or on the camera daughter board, prior to transmission. Fortunately, serial transmission standards currently exist that can easily support such data transfer rates, further highlighting the benefit of employing this communication format.

Electromagnetic interference and other noise artifacts can corrupt the data transfer process. Techniques common in the art, such as using inductive filter cores, can be employed to minimize these effects.

Color Processing

For many applications, visible spectrum single-chip color sensors are used. Three components of color at every pixel are realized in these sensors by locating a patterned color filter, also called a 'mosaic', over the pixel array. Often a Bayer color mosaic is used. The advantage is that a single sensor is able to pick-up a full spectrum of visible color. The disadvantage is that an additional demosaicing processing step is necessary to reconstruct the color information. In the preferred embodiment, the demosaicing process is performed on-board the image sensor. However, it is also possible to implement the demosaicing in a custom core either on the camera daughter board or on the central processing electronics.

Stitching and Blending

The processing required to stitch corresponding images to create a wide field of view panorama is well known in the art. The primary goal of this processing is to geometrically transform the pixels into a common frame of reference. This is commonly done using a variety of transformation techniques, projective transformations being one of the most general transforms employed.

Because the digital cameras in this design are mounted in known locations, many of the stitching parameters are invariant. However, absolutely precise positioning of the cameras is not required. While some mechanical adjustment of the camera daughter boards is advised, fine tuning of the stitch parameters can be achieved by calibrating the camera before use or even in real-time by performing periodic calibrations in parallel with standard operation.

Calibration is often facilitated by using a patterned target, since knowledge of a geometric pattern can be used to align the views from neighboring cameras. This can be achieved by either placing a physical target in front of the camera or by projecting a pattern of structured light. For real-time recalibration, the latter technique is preferred. For visible spectrum sensors, this light could even be concentrated in the near infrared region of the spectrum, to be invisible to the human eye but visible to the image sensor (since many visible spectrum sensors are also sensitive to the near infrared spectral region). Projecting a structured light pattern can also be leveraged to perform more accurate depth analysis of objects in the scene.

Stitching performance will be affected by the distance of objects from the camera. (This effect will increase in severity as the distance to objects decreases.) This can be addressed through calibration steps or manual adjustment of stitching parameters by the user. In the ideal case, the stitching algorithm would take into account the distance of objects in the scene. A 3D estimate could be attached to every pixel of a scene enabling the use of depth dependent stitching parameters. This will result in a dramatically improved stitched result.

Besides stitching the various images together there are additional processing steps that are necessary in order to create a plausible output image. In particular, it is common, due to differences in the operation of the digital cameras, to see distinct differences (in color, contrast, etc.) in the regions of the bare stitched image corresponding to the different image sensors. This can be especially apparent if there is a significant difference in the brightness of different areas of a captured scene (for example, when capturing a normally lit interior room, with windows looking out onto a bright sunny day). Due to limitations in the dynamic range of typical image sensors, these kinds of common imaging scenarios make it challenging to create a plausible final stitched result. Accordingly, an additional processing step is indicated to identify and blend these transitions to make the overall resulting image more continuous. Such blending techniques are commonly known in the art.

CODECS

Due to the significant volume of data that can accumulate in video applications, a preferred embodiment would integrate a video compression stage into the data processing framework. This could be employed for real-time processing or as the data is written to either volatile or non-volatile memory. There is a wide variety of compression/decompression (CODEC) schemes that can be employed for image streams, but H.264 and MPEG4 are two common standards used currently. The use of a CODEC can decrease the amount of bandwidth and memory required to transmit and store the image streams by a factor of up to 50 or more. The actual compression amount will be a function of the amount of motion in the scene, the accepted level of 'loss', and the effectiveness of the compression scheme, as is known to those skilled in the art of video compression and decompression.

Memory Encoding/Decoding

Both volatile and non-volatile memory solutions are required for operation. Any realistic memory architecture can be employed. In general, a wide area of volatile memory is typically reserved as a frame buffer to store multiple sequential frames of video for each digital camera. The data can be compressed, uncompressed, stitched or unstitched or stored in any convenient form.

In a similar way, non-volatile memory can be employed to realize digital video recording (DVR) functionality or simply to hold a large volume of rapidly accumulating data from individual digital cameras prior to being combined into a final processed image stream in a post-processing (or parallel-processing) step.

The critical factor in interfacing with memory is the memory bus bandwidth. For example, consider the case of a camera system built around the OmniVision OV02724 sensor, identified above. In an architecture that transfers all 12 camera feeds onto one memory bus, a one-way memory bandwidth of 19.2 Gbps would be required. And, in fact, a total memory bandwidth much greater than this level is actually required, when considering that once written to memory, the data must also be available for additional processing operations (stitching, blending, etc.) and export for real-time display or storage in non-volatile memory.

There exist many useful techniques employed by those skilled in the art to optimize memory bandwidth usage. One example involves a situation where two users want to tap into the same video stream in memory at two times, a few minutes apart. Instead of instituting a new memory transaction for each user, the data can be pulled out once and then a time-delay circuit (such as a barrel shifter) could be implemented to delay the video for delivery to the 2nd user.

In the case of wide field-of-view imaging where smaller cropped sections of the video is sent to individual users, the situation is more complicated since any two viewers would likely not want to view the exact same sections of memory. However, optimization schemes could be developed that used statistical techniques to grab and time-delay large parts of the 'popular' sections of video and then fill in the extra sections as needed.

And while optimized memory interface techniques can be employed, the fact remains that multi-camera systems have significant memory bandwidth requirements and advanced memory architectures will be required to address this need. A preferred embodiment is to use an Advanced eXtensible Interface (AXI) bus structure. An AXI bus structure is preferred because it not only can support the high bandwidth communication required but also because it is compatible with a wide variety of commercial cores (such as ARM cores) that can be leveraged to complete the processing tasks.

Video Output

Implementing an effective display mechanism for the captured and stitched video is a natural requirement. The video can be formatted for display on either a 2D or 3D display technology. For a stereo vision system, it is most natural to consider the use of 3D display technologies such as head mounted displays and 3D TVs. Another technology of interest is a so-called Immersive Display Experience' taught by Perez in US Patent Application #2012/0223885. This technology can be thought of as a kind of 'immersive cave' where 3D displays surround a user to give a fully immersive experience. All of these 3D display technologies work by displaying separate image feeds to each eye. Often, for a 3D display, a specialized output format, such as side-by-side, top-bottom or 'full HD 3D', is required. Different cores can be written to enable the appropriate output compatibility.

Users will sometimes not want to view the captured image streams in 3D format. In these cases, 2D image stream displays of the output from one particular 'eye' can be displayed. However the 3D capabilities of the technology can still be leveraged by, for instance, overlaying 3D depth information of different objects in the scene, the depth estimates having been estimated through stereo triangulation, as described next.

Additional Processing Steps

A variety of additional processing steps can optionally be performed on the data. The most likely additional processing step is to perform stereo triangulation to estimate the depth of all objects in the scene. Depth information can be very useful for a number of applications as was discussed earlier in this document.

Additional sensor technologies could be added to the platform to augment performance. For instance, time-of-flight emitters and sensors could be added to enhance depth estimations of the system.

More significantly, orientation tracking technologies like accelerometers, gyroscopes and magnets, similar to those used in the head tracking systems of commercially available head mounted displays, could be used to sense the orientation of the camera system during image capture. An application discussing the use of such technologies to control memory encoding operations is described later in this document.

Processing Architecture

One of the most significant challenges in realizing a processing architecture is satisfying the bandwidth requirements of a typical stereo processing algorithm. The system must support one way, single channel bandwidths on the order of 1.6 Gbps and aggregate bandwidths well in excess of 20 Gbps (perhaps even exceeding 100 Gbps). While these data processing rates are significant, they are not insurmountable, especially if creative processing architectures are employed including data compression schemes, parallel processing and separate memory interface designs.

In addition to overall data transfer speed, the architecture must also incorporate technologies that facilitate high performance projective image processing operations. For this, there are a number of digital processing technologies that can be employed. These include standard single- and multi-core CPUs, digital signal processors, graphical processing units (GPUs), field programmable gate arrays (FPGAs), ASICs or any other electronic processing device.

GPU technology, in particular, has grown in capability in recent years to provide just the kind of floating point parallel processing that would be needed to solve many of the processing and memory interface challenges involved.

FPGAs are used extensively in the field because of the numerous benefits that these components provide, including: Scalability, Ability to perform massively parallel processing tasks, flexibility, and reconfigurability.

Each processing technology offers a unique capability that can be leveraged to address the image processing requirements. Hybrid architectures could therefore be employed to combine complementary capabilities. For example, some floating point operations, like calibration, stitching or blending, could be performed on a GPU, while high speed, fixed point operations could operate on the FPGA fabric. There is a lot of flexibility that can be applied. And the relentless pace at which processing capability is growing, as predicted by Moore's law, will continue to ease the task of designing a comprehensive processing solution.

Applications

It is clear that there are numerous applications to which an effective wide field-of-view stereoscopic imaging technology can be applied. Adding the adjustable or selectable parallax distance functionality described herein will further enhance potential performance. The following sub-sections describe some general and specific applications that are enabled through the use of various embodiments of the invention.

General Enabled Applications

The following describes the way in which this technology will enhance numerous applications:

Telerobotics: When remotely operating robotic platforms, like UAVs, USVs, and UGVs, humans rely almost entirely on visual cues. Sometimes these are provided through a single monoscopic camera (as is the case in many Unmanned Aerial Vehicles), or through a single pair of stereo cameras. The wide field-of-view, high resolution, stereoscopic capabilities of the underlying technology address many of the limitations inherent in tele-robotic operation. Integrating now the ability to adjust parallax distance provides at least two additional benefits: First, the parallax distance of the capturing camera system can be fine-tuned to the interpupillary distance of the operator enhancing the operator/platform immersive link. Second, the parallax distance can be adjusted to enhance 3D depth estimates which can be overlaid in the display to provide additional context for the operator.

Surveillance: The underlying technology is ideally suited for use as a surveillance node due to its ability to see in all directions at all times. And the stereoscopic capabilities can be leveraged to build up a depth-map of a scene, which can be used to more effectively track objects and/or perform things like facial recognition. The adjustable parallax distance embodiment can be leveraged to enhance these depth estimates. For example, consider mounting a large scale version of the camera system described herein to the deck of a Naval vessel or to the fuselage of a military aircraft. The parallax distance could be adjusted (possibly in an autonomous manner) to better identify and track threats in different environments.

Traffic Control: A 360 degree imaging solution is critical for traffic control, not only to capture the presence of oncoming automobiles down intersecting streets, but also to identify pedestrians in any direction and anticipate their desire to cross. Such a system could be used to optimize the flow of traffic and pedestrians. In addition to enhancing safety, such systems can provide dramatic savings in commuter travel-time, automobile starts and stops (which are associated with maintenance requirements), fuel consumption and emissions. Estimating the distance and velocity of objects in such a scene is critically important to estimating closing distance of all parties and optimizing flow and safety. A variable baseline design could be adjusted based on the distance and velocity of on-coming traffic to improve performance. A selectable baseline system could be used to more effectively estimate the distance and velocity of both near and distant traffic.

Collision Avoidance: If such a system was attached to a vehicle (automobile, marine vehicle, or aircraft), it could be used to warn of an impending collision with another object (another vehicle or animal) from any direction (like a deer jumping out of the woods). The variable parallax distance would allow the 3D capabilities to be exploited over a wide range of distances. This could have perhaps the most significant impact for aircraft since there are both so many blind spots and so little time to react given the closing speeds involved.

Sports/Entertainment Event Viewing: The capabilities of the underlying technology can immerse a user in a scene. This can enable more effective capture and broadcast of events with a perspective that is not possible with current technologies. Below, a detailed discussion is provided on how the technology described herein can enable capture of live events in a new and innovative way.

3D estimates of captured scenes could also be used to add special effects to a scene by improving the 'tracking' of any captured scene. As those skilled in the art of Computer Generated Imagery (CGI) are aware, good tracking is critical for adding fabricated elements to scenes in a realistic and size-accurate way.

Mapping and Surveying: The technology could be used to capture the 3D measurements of any space of interest. 3D measurements can also be fed to an overall mapping operation, such that a solid model of the scene is constructed, using the camera as a reference point. The large volume of frame data can be continually averaged and combined statistically to improve the fidelity of the model. Furthermore, if the camera is mounted to a moving platform, motion tracking can also be employed and fed into the modeling procedure to expand the overall model and further improve accuracy. And if particular elements of the scene must be captured with increased precision, the variable baseline of the system can be adjusted (either manually or autonomously) to fill in the required details. Such measurements can be fused with technologies, such as time-of-flight emitters and sensors to realize a precise understanding of the depth of objects in the scene.

This could be used in the field of interior design and renovations to estimate the length, area and volume of a space as designers work to renovate or decorate an area. In a similar fashion, integrating a camera like this on a UAV and sending it on a mission to autonomously inspect pipelines, power wires, bridges or roads could represent a significant savings in manpower from having to send a human to do this monotonous job.

The estimated depth could also be leveraged by applications such as augmented reality where computer generated content is overlaid with the scene to improve overall performance.

Telepresence: The immersiveness of this system would allow users to experience and interact with a remote scene and people at an unprecedented level. One particular application where this could be particularly useful is for doctors to visit patients in remote or hard to reach hospitals. Remotely, the doctor would have the capability to see the patient, the instruments to which the patient is connected and even interact with the nurses and family members in the room. The immersiveness from the high resolution and depth provided by the system would deliver a greater level of perception to allow the doctor to more effectively do their job. The adjustable parallax distance capability would allow the remote user to more effectively discern details of the scene.

Remote Tourism: The camera system could be used to capture scenes of interest. For example, hotels, restaurants or other public venues of interest could be captured for commercial promotion. Homes could be captured for real estate sales. Live feeds could be used to capture events at public venues. The selectable- or variable-parallax distance could be automated or expertly adjusted to deliver scenes with optimal effect.

Thrill Rides, Gaming, and Training: The system could be used to capture events and scenes to be played back to users on demand. For example, the sensation of standing at home plate in Fenway Park when receiving a 100 MPH fast ball during the World Series could be captured. Such scenes could be played back for interested fans at home or in museums to allow people to experience events from a unique perspective. In the same way, the system can be used to more effectively train people for critical situations in the most immersive way possible. For example, soldiers could be trained on what to expect in combat by playing back video from a helmet mounted version of one of these camera systems. The variable parallax distance of the system could be adjusted based on what scenario is being captured or perhaps continuously as the mission is conducted.

Live Event Capture—Memory Creation

One of the most compelling uses of the technology described herein is in capturing and redisplaying live events, like sporting or concert events, in an entirely new way. These events could be professional or amateur events or even general public assemblies or occurrences.

The opportunity is best explained by considering a common scenario: Parents take great pleasure as spectators at their children's school sports or concert events and they often try to capture these by holding up their phone-camera or a regular camera during the proceedings. And yet this process is almost self-defeating since that parent is usually so busy trying to capture the scene and hold the camera steady that they can't enjoy the moment itself. In addition, since they rarely know when 'the good parts' will occur, they often capture long periods of uninteresting footage and have little time for post-process editing after the event. The cameras in use are often of low quality and at poor vantage points to capture the action. And, finally, if they are capturing the scene in 3D, they may be too far from the action to get a good 3D 'effect'.

Figure 20:
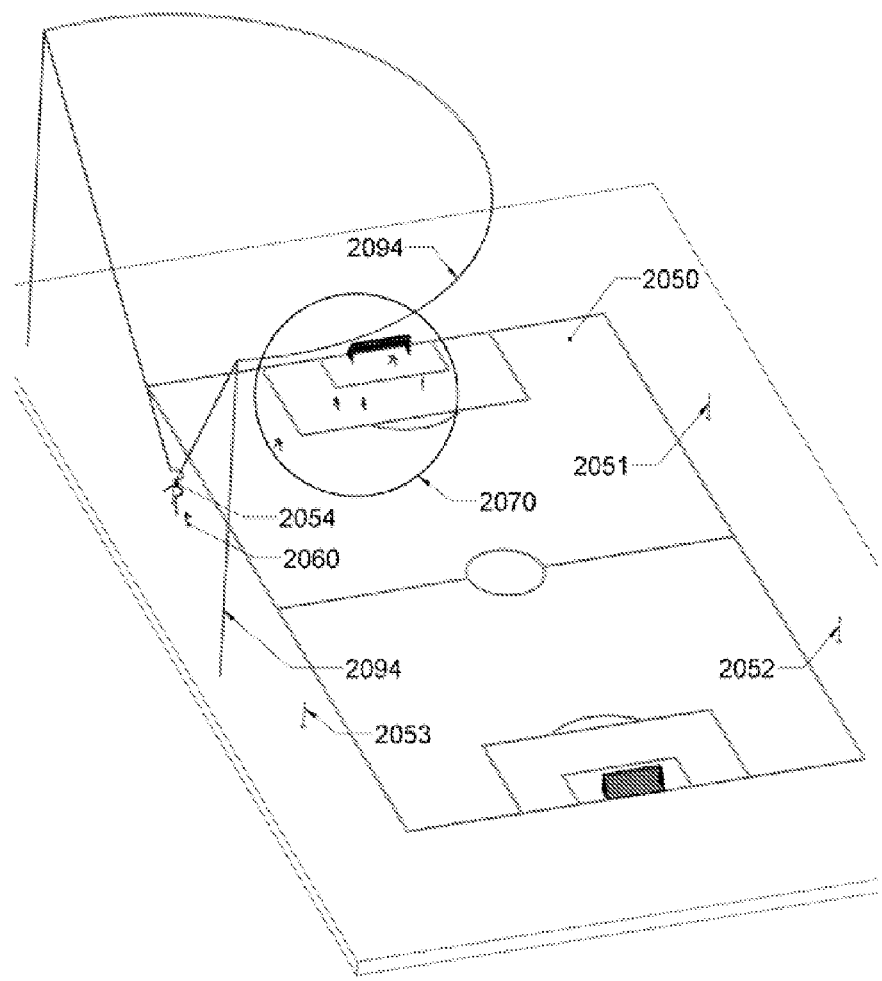
FIG. 20 is an isometric view of a typical event where a spectator might want to capture video clips from a selectable parallax distance wide field-of-view video network in accordance with an embodiment the present invention.

The camera system described herein could be coupled with a video capture system that could overcome all of the above problems and create an event capture system of dramatic usefulness not only for parents but for any spectator of any event. In fact, the following idea would work whether the underlying camera system was a monoscopic or stereoscopic wide field-of-view camera system. In the following, the more complex stereoscopic embodiment is described in order to further illustrate how the adjustable baseline embodiments of the invention could be leveraged to enhance the performance of this system. The preferred embodiment would operate as follows:

FIG. 20 is an isometric view of a typical event where a spectator might want to capture video clips from a selectable parallax distance wide field-of-view video network in accordance with an embodiment the present invention. This particular image is of a typical child's soccer game.

Four of the extended elevation, selectable parallax distance cameras 2051, 2052, 2053, and 2054 are mounted adjacent to a soccer field 2050. The cameras can be set-up at a convenient location, such as the two 25-yard lines on either side of the field. The cameras could be connected in a wired or wireless data network architecture. Integral to the system would be the use of a central node to control the entire system.

These cameras would not even have to capture a full 360 degree panorama, but perhaps a 180 or 200 degree horizontal field of view. In this particular embodiment, each of the cameras would be designed to cover a 200 degree horizontal× 100 degree vertical field of view. A constructive wire-frame capture frustum 2094 for camera 2054 is illustrated in the figure. Identical frustums exist for the other three cameras.

The cameras could be elevated on a stable platform to ensure a good view of the field. In this case, a 3 meter pole is used to mount each camera.

As the game progresses, the cameras would record a high resolution wide field-of-view image of the scene on a circular buffer that gets overwritten after a certain amount of time.

For a typical spectator 2060 (such as a parent), for most of the game, nothing of interest would occur and they would be able to relax and enjoy the event.

However, if something remarkable occurs such as their daughter scoring a goal, after the celebration, that parent 2060 would then be able to pull out their phone, tablet or other smart device and interface with the camera network at the field in order to capture the action 2070 that just occurred.

In an embodiment, a software application would operate on their device that would interface with the central camera system node. This node must be able to initiate separate threads for each user that will want to connect and it must also implement logic for multiplexing the requests for video so that no requests are lost. It will also have to optimize memory interactions to preserve bandwidth using techniques similar to those described earlier in this document.

Figure 21:
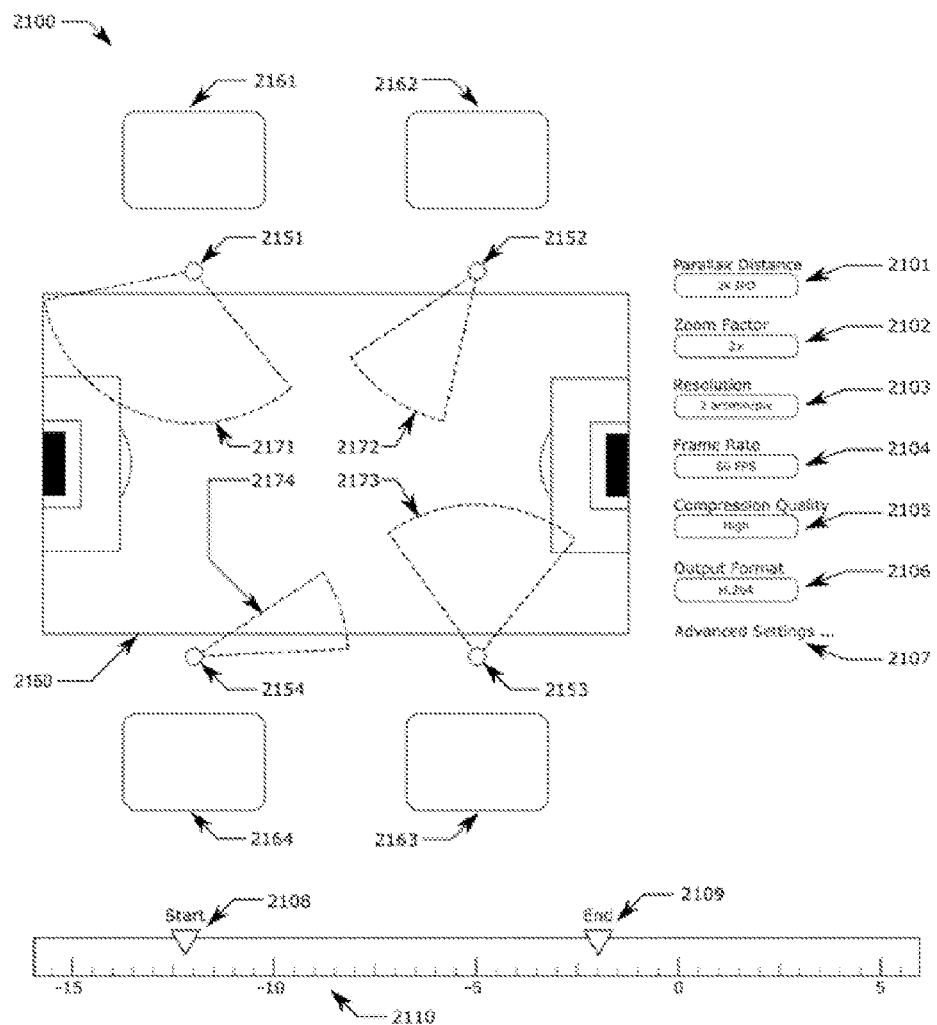
FIG. 21 is an illustration of a graphical user interface that could be used to engage with a selectable parallax distance wide field-of-view video network for customized video clip purchase in accordance with an embodiment the present invention.

FIG. 21 is an illustration of a graphical user interface (GUI) 2100 that could be used to engage with a selectable parallax distance wide field-of-view video network for customized video clip purchase in accordance with an embodiment the present invention. This interface would be part of an software application operating on a particular user's device. It will represent a portal by which the user can specify the video clip of interest they would like to obtain. Preferably this portal would provide the most convenient and intuitive interface possible so that end-users could quickly make accurate performance selections.

In reality, all of the information shown in the figure might not comfortably fit on one screen. In this case, the interface could be logically broken into multiple interface screens. The parent/user would ideally be able to make the following selections:

Cropped View: The GUI would display a representation of the field 2150 and the cameras 2151, 2152, 2153, and 2154 in place at the field. The user could select from which of these cameras to grab footage (multiple cameras could be selected). In addition, they would be able to adjust the viewing frustums 2171, 2172, 2173, and/or 2174 to define how wide (or how high) an angle to capture (for example, do they want the entire 180 degrees of capture or perhaps a limited range of azimuths?). Snapshots from each of the cameras could be provided in preview windows 2161, 2162, 2163, and 2164 to assist in setting these crop settings. This process can be thought of as the user specifying their desired 'capture frustum'.

Parallax Distance: For general viewing, the camera superset with a parallax distance matching the human eye could be used. However, for close-up shots, a longer parallax distance in concert with a greater zoom could provide an effectively closer shot of the action. Thus, the user could set the parallax distance 2101 from which to pull video data. For example, this might be specified as a multiple of a human's interpupillary distance (IPD). Alternatively, a zoom factor 2102 may be selected. Since the system will operate on already recorded content, the selection of parallax distance and zoom will likely be linked and will probably be selectable from a drop-down list of possible alternatives. For example, options may be presented such as 'view 2× closer', 'view 4× closer', etc. where the parallax distance and zoom settings are linked.

Quality: Resolution 2103, frame-rate 2104, compression-quality 2105 and output format 2106 could all be specified. Advanced settings 2107 could be accessed on additional pages.

Clip Length: The user would specify the time period of the desired clip. This could be as simple as saying 'give me the last 5 minutes'. Or more sophisticated editing might occur. One possible embodiment would use a time rule 2110, where the sliders would be used to specify the start-time 2108 and end-time 2109 for the clip of interest. In the preferred embodiment, sample video of the clip would be displayed in the preview windows 2161, 2162, 2163, and/or 2164 to assist the user in specifying the start/stop times. However, if bandwidth and communications are constrained, periodic snapshots of the action could be provided to assist the user in selecting a start and end point of selection. Because of the circular buffer, the users would be able to select for off-loading video from as far back as, approximately, the length of the circular buffer.

In some circumstances, the scene might be static and a parent's 'ideal performance settings' may be known before the event starts. One example where this might be the case is viewing a child's holiday concert where the parent has a good idea of where the child will be located within the viewing frustum of the camera. In cases like this, the parent could create 'pre-set performance settings' on the network camera system. Then, at exceptional moments in the proceedings, they could capture the last few moments by simply tapping an indicator like 'purchase the last 2 minutes' or some other customized setting to enable quick clip capture. This would further alleviate the problem of diverting a person's attention from enjoying the event of interest.

Once all the selections were made, the user would 'purchase' the clip for a reported price (or in exchange for receiving some kind of sponsored content, like an advertisement) and, based on a user profile that would already be set-up on the system, the purchased clip would be electronically delivered to that user for future download at their leisure.

The system would be designed to allow a large number of users to interface with the camera network in a multiplexed manner to ensure satisfactory capture of customized video clips of a scene for all users.

There are numerous benefits that this new process would provide. The most significant is the following:

Preserving the Memory: This system would solve the ironic problem encountered by many parents that show up to watch their kids' sporting or performance events; namely, the practice of holding up a low quality cell phone camera to capture an event because the parent 'wants to capture it as a memory' when, in fact, the process of trying to capture the video destroys that parent's ability to enjoy the moment and form a lasting memory of their own.

The other benefits are as follows:

Best Seat in the House: Because only one or a few of these cameras are needed, prime locations can be selected to capture the best view of the event. Since each person can tap into that video, everyone would have the option to capture quality video from a great location.

Real Time Editing: This would solve a problem for parents that try to capture the entire event with the idea that they will go back later and pull out the important clips, which can occupy hours of their valuable time. With this set-up, the moments that most resonate for each parent will motivate the capture, resulting in real-time editing of the event. At the end, each parent will have, waiting for them, just the clips of the experience that they most want to remember.

High Quality Camera: Because operators are not selling the camera but the 'Video Camera As A Service' (VCAAS), the business model supports the incorporation of much higher quality cameras and optics than would normally be used by general spectators. Thus, high resolution, high frame rate, wide dynamic range and/or superior color depth images could be captured and the user could select the quality of image to off-load. The circular buffer length could also be significant. In many cases a 10 or 15 minute buffer would be adequate since most spectators know almost immediately if they want to capture something that just happened. However, if the market called for it, longer buffers that capture the entire event could also be realized.

Stitching in Post: The process would also support operations where the separate video streams could be off-loaded in parallel and stitched 'in post'. This would eliminate the stitching and blending steps from acting as processing bottlenecks, especially if very high resolution and/or high frame rate video was captured.

Again, the above system would work for either traditional monoscopic or stereoscopic capture of a scene. In the preferred embodiment, telephoto-stereo techniques would be used to coordinate the parallax distance with standard camera control parameters, like zoom factor, aperture, gain, etc., to create a more effective immersive capture of the scene. For example, one set of cameras might be set-up to match the interpupillary spacing of a human while one or more additional supersets of cameras could be set-up with alternate parallax distances. A main view of the scene would be captured by the $1^{st}$ set of cameras whereas the additional sets could be used to realize an enhanced view of interest.

A hybrid camera embodiment combining a variable parallax superset on top of a selectable parallax distance design could be used. Such a system could use a combination of depth measurements and image processing techniques, like optical flow, to 'follow the action'. In doing so, the variable parallax stage could be adjusted in tandem with the camera zoom for more effective immersive 3D capture of the events, as was discussed in connection with FIG. 25, above. In the preferred embodiment this would be done autonomously. Combining such a camera with a selectable parallax distance matching the IPD of a human, could offer superior performance.

Such scenes could be captured for general enjoyment or 3D analysis. For example, a coach might want to quantify the position of players on the field for analysis. The feeds from different parallax distance captures would offer a variation in the accuracy and range of the depth estimates.

As for delivery, in this embodiment, the video clips are electronically delivered to become part of the users overall media library. There are multiple modalities by which the user could enjoy the custom created content. In one example, camera operators could work out a deal with internet service providers, cable TV companies or any group that delivers media for consumption by end-users, like Facebook, to allow the video clips to be accessed directly through the consumer's cable box or home entertainment network. In a preferred embodiment, while at home watching television, they could bring up the guide (often referred to as the Electronic Program Guide (EPG)) on screen and a new tab of personal video clips could conceivably be displayed. The parent could immediately come home and share clips of their child's amazing soccer play with friends and family. Short trailers of each clip could also be autonomously created, perhaps by selecting the few seconds with the most action in the clip, to assist the user in selecting a clip. The functionality can be categorized as a method to save and view video that is part of an overall private media collection. Cloud and locally-based media management systems are envisioned for organizing the video clips in a manner identical as if the clips were captured with a personal camcorder and edited in a more traditional way.

Tapping into video as a function of global position is also envisioned. In such a case, the video, flagged for public release by the owner could also be tagged with the global position of where it was captured, using techniques common in the art.

There may be privacy concerns in using a system like this. However, the fact is that at most public gatherings, any person is able to capture video of an event. Indeed, many people do, as discussed above. The camera system described here, however, may actually provide more control over privacy. Since each person would have to register with the camera network, presumably with their own account, there could be ways to control who is granted access to the video data and who owns the video clips after purchase. For example, at a school event, mechanisms could be put in place to allow only authorized family members or friends to log-in and download content.

Policies can be established to clarify ownership of purchased video clips as part of the user registration process. For example, the policies may guarantee that once a particular clip (created as a function of a number of user-selected performance settings) is delivered electronically, it is subsequently destroyed. In most cases, the purchaser would view that video at home with family and friends. But preferably they, too, could be allowed to add a protective code to the video clip in the case that they'd want to release it for public consumption. There are many options.

Control over the capture, sale, and ownership of video clips can extend to the use of this system at commercial events. For example, this system could be employed at a concert event and the video sold to concert-goers for an additional price. To guard against piracy, the video clips could be encoded with a protective code (similar to the way commercial BluRay discs are protected), with information like copyright data, watermark, event ID, camera location and viewing vector information, to prevent unauthorized sharing or public release.

Using the content for advertising can be quite useful. In some of the prior art, significant effort is expended to study marketing trends related to what video content was selected and viewed by consumers. This camera system offers an even more in-depth view of marketing trends. This camera system allows not only the ability to understand how many consumers choose to watch a particular commercial event, but also the statistical data (perhaps even broken down by demographics) on what scenes (and viewing vectors) within that video are being selected. Information like this can significantly enhance targeted marketing efforts.

Viewing vector specification may also occur on the user side. For example, it's possible that special set-top boxes (STBs) would be developed that would receive the entire wide field-of-view video feed. These STBs would allow a variety of viewing modalities. For example, if a user wanted to experience the scene with a head-mounted display, the STB would send a cropped area of the scene but also respond to the head tracking cues from the HMD, adjusting the view pointer to allow the user to 'look around' the event. The end-user could in theory also interface the STB to an 'immersive cave' type display system, a room equipped with 360° or even omni-directional 3D screens, allowing the display of the entire video stream. In the former case, data on what parts of the event that the end-user focused could be streamed back to the source in order to gather market trends. This is similar to some of the prior art where users' viewing habits are tracked.

Processing in Post

In embodiments of the invention, the processing architectures will be powerful enough to perform all required processing and export the video in real-time. This would allow its use in a number of live video applications, such as live sports capture or surveillance. However, in many situations, as in the soccer application described above, it may not be possible (due to bandwidth limitations of the processing architecture) or even necessary to perform the image stitching, blending or other processing steps (such as depth computations) in real-time. In this case, a realistic strategy is to write each of the separate image streams to non-volatile memory in real-time, while processing the scene in a slower, parallel, process.

As discussed above, because video data can grow significantly, it's likely that a compression core would be integrated into each of the camera feeds to dramatically reduce the amount of non-volatile memory required to store the image stream. In this preferred embodiment, the separate camera streams would be written to memory in a compressed fashion. The processor, according to its own schedule, would recall each frame of the image stream, build up the full frame rate stitched and blended image stream, perform any required additional processing, and re-write it to non-volatile memory (perhaps with additional compression applied). Users would then be able to pull up the stitched and blended omni-directional video for viewing a short time after the capture of the original scene. In the preferred embodiment, this processing would occur automatically in tandem with video capture and be largely transparent to the user.

Figure 22:
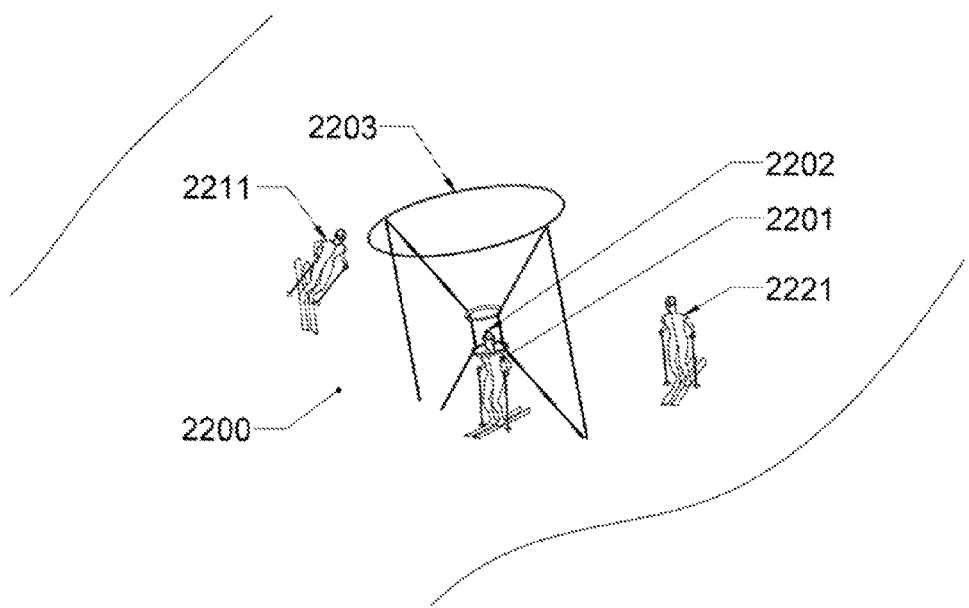
FIG. 22 is an illustration of a dynamic event where an extended elevation, wide field-of-view video system could be used to capture an event, but where the camera orientation is dynamically changing in accordance with an embodiment the present invention.

FIG. 22 is an illustration of a dynamic event where an extended elevation, wide field-of-view video system could be used to capture an event, but where the camera orientation is dynamically changing in accordance with an embodiment the present invention. This represents a scenario where post-processing of video would work well. A skier 2201 would mount a Pancam 2202 to his helmet. The central processing electronics and memory may be too large to also mount to the helmet but could be integrated into a vest (or some other wearable component). Serialized data transfer from the camera to the vest would proceed exactly as described above. An extended elevation design is preferred that would provide a capture frustum of 360 degrees horizontally and 100 degrees in elevation. In contrast to single point of view cameras, as the skier progresses down the mountain 2200, the camera will capture events in all directions, such as the antics of other skiers 2211 and 2221 on the run.

After the run, perhaps on the way back into the lodge or while standing in a lift-line, the electronics would post-process and stitch the captured video frames. At a future time, the skier could play back the entire run or series of runs to their friends and family through a 3D display technology like the Oculus Rift head mounted display. This technology would rival the GoPro® cameras that are being used in a huge variety of activities around the world today.

Eventually, once processing electronics become powerful enough and affordable enough, this stitching can happen in real time so that not only will, for example, that skier be able to capture each run for future viewing, but they might also be able to transmit real-time video to interested end-users who can view the ski-runs as they happen.

Motion Controlled Memory Encoding

The above application highlights a significant limitation in mounting a traditional, single point-of-view, camera to a helmet (or other moving structure) to capture a dynamic event. This could be during a ski or snow-board run, while surfing, biking, parachuting or performing any kind of dynamic activity. Users of these systems often complain about the need to hold their head (or the moving structure) steady in order to capture video of a particular event. The technology proposed herein significantly alleviates this capture requirement because of the wide field-of-view captured.

While this solution will capture a much larger fraction of the overall scene, the one issue that will still be present, however, is that because the camera platform continues to move during capture, playback of the raw video will be unsteady, with an orientation matching that of the platform during capture.

This problem can be addressed using motion tracking technology. In recent years, there has been significant progress in developing high performance motion tracking with minimum latency at affordable costs. Of note is the head tracking technology in recently developed head mounted display technologies, such as the Oculus Rift, made by the OculusVR company. The motion tracking technology typically uses a combination of accelerometers, gyroscopes and magnets to estimate platform position with minimal latency and zero drift.

The output from technologies like this could be leveraged for use in encoding the video as part of an embodiment of the invention. For example, in the skiing application, a wide field of view camera system, combined with head tracking sensors, would be mounted to the ski helmet. In the preferred embodiment, the sensors would, in real-time, measure all three rotational orientations of the head: roll (tilting head side-to-side), pitch (tilting head back and forth), and yaw (rotating the head side-to-side around an axis substantially aligned with the neck). (Three translation degrees of freedom could also be estimated as additional degrees of freedom.) For each frame of the image stream captured, this tracking data would be written directly into the data stream as a series of three (or six), 4-byte words, during the blanking time that is normally present at the beginning of the frame (e.g. during the 'vsync' time period).

Figure 23:
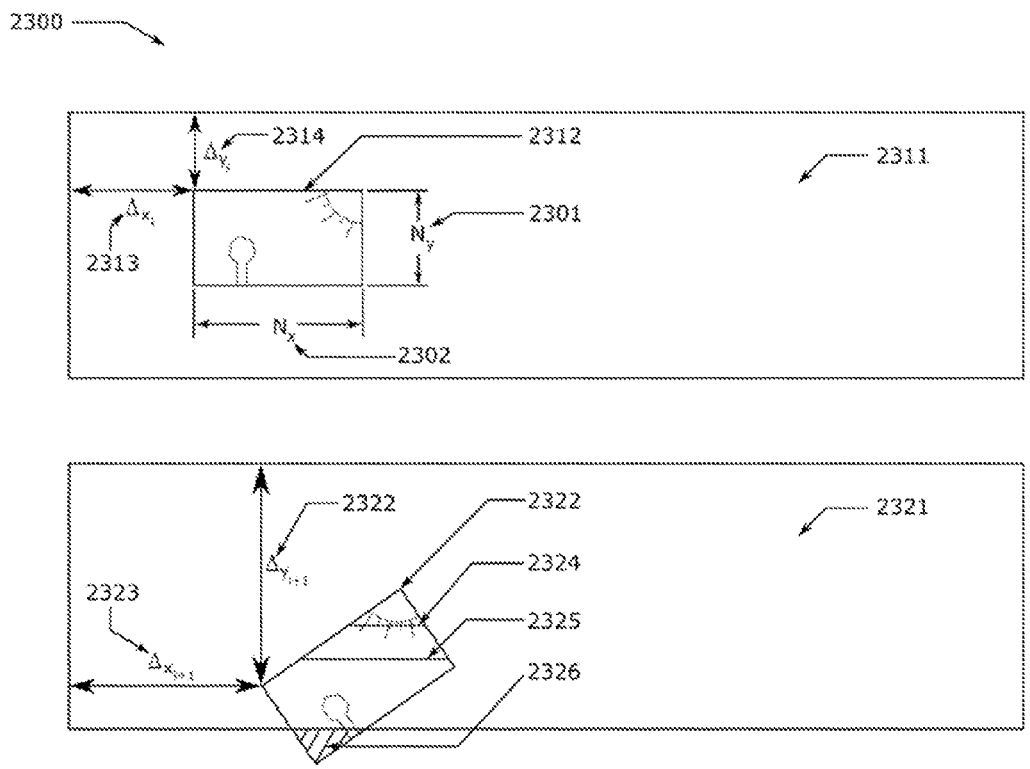
FIG. 23 is an illustration of the encoding-to and read-back from memory of a cropped region of interest from a camera feed where the capture camera orientation is dynamically changing in accordance with an embodiment the present invention.

FIG. 23 is an illustration of the encoding-to and read-back from memory of a cropped region of interest from a camera feed where the capture camera orientation is dynamically changing in accordance with an embodiment the present invention. It is used to illustrate potential strategies that can be implemented to 'subtract out' base camera motion to allow a user to more easily control the viewing vector for playback. This figure illustrates two sequential frames of image data in memory, each represented as a rectangular area in memory. These are two frame buffers that contain all of captured pixels of that wide field-of-view frame. At one instance in time, wide field-of-view frame 2311 is stored in this frame buffer. At the same time, a user desires to observe a cropped section 2312 of this overall memory array. The cropped section represents a particular viewpoint or object that the user would like to observe. In the image, the viewer is focusing on a tree with the sun in the upper right. The cropped section is characterized by a horizontal number of pixels 2302 and a vertical number of pixels 2301. The upper left corner of the cropped region is offset from the upper left corner of the frame buffer by $\Delta_{x_i}$ pixels horizontally 2313 and $\Delta_{y_i}$ pixels vertically 2314.

The cropped view starts out aligned with the overall frame buffer array. In the next frame of video captured, however, the camera orientation is expected to vary due to, for example, the roll, θ, pitch, φ, and yaw, γ, of the skier's head. For example, if, in the time between capturing the first and second frames of video, the skier's head pitches up, rolls right, and yaws left, the cropped view 2322 would have to change orientation in the second frame buffer 2321 to maintain the general orientation of the scene of interest. Now the offset distances are $\Delta_{x_{i+1}}$ 2323 horizontally and $\Delta_{y_{i+1}}$ 2322 vertically. More significantly, the desired area of memory to view 2322 is now at an angle. So, in the proposed memory interface method, the processor would be programmed to account for the encoded motion to playback a smooth stream of images.

The only artifacts of motion would be that portions of the desired cropped region 2322 may not be available for some scenes. This is illustrated in the figure where one portion 2326 is unavailable, as indicated by the hatching shown. In the played-back video, this section would likely show as a blacked-out regions of the overall frame.

In general, these tilted memory access operations incur significant bandwidth penalties using conventional memory (like DDR). Pulling out a cropped rectangular section of memory is common and is usually performed using a 'strided' memory operation, where an equal number of pixels is read from each row. But when pulling out a tilted area from memory, a different number of pixels must be read from each region of memory. For example the number of pixels to read from row 2324 is smaller than the number of pixels required for row 2325. Furthermore, even after the pixels are read, they will preferably be reassembled into a square orientation matching the displayed version of section 2312, which can incur even more processing as they are transformed back into a desired orientation. These kinds of row dependent reads and writes can significantly degrade memory bandwidth.

An alternative approach to solve this problem is to encode the captured video into memory as a function of the real-time head tracking sampling data. In this case, the frame buffer is filled as a function of a desired orientation. For example, it might be aligned with the gravity vector during storage.

Employing this kind of controlled video capture and storage will obviously require additional processing and bandwidth. But the advantage of this approach is that the data is 'straightened' upon capture and once written, retrieval and playback of steady video will be much easier and faster. This may mean that the processing technologies required on the display side will not have to be as sophisticated or powerful to view smoothed and aligned video feeds. This strategy will have advantages in many applications, especially in the field of wearable camera technology.

These motion controlled encoding techniques are equally useful for recording monoscopic or stereoscopic wide field of view video. Thus, anyone skilled in the art of either of these fields could utilize the encoding concepts presented here.

Various embodiments of the present invention may be characterized by the potential claims listed in the paragraphs following this paragraph (and before the actual claims provided at the end of this application). These potential claims form a part of the written description of this application. Accordingly, subject matter of the following potential claims may be presented as actual claims in later proceedings involving this application or any application claiming priority based on this application. Inclusion of such potential claims should not be construed to mean that the actual claims do not cover the subject matter of the potential claims. Thus, a decision to not present these potential claims in later proceedings should not be construed as a donation of the subject matter to the public.

Without limitation, potential subject matter that may be claimed (prefaced with the letter "P" so as to avoid confusion with the actual claims presented below) includes:

P1. A wide field-of-view stereoscopic camera system comprising:

a support structure having M arms, where M is an integer equal to or greater than 2, each of the arms being spaced around L constructive circles, each circle defining a plane, where all planes are parallel to a horizontal plane, and each of the arms having one or more mount points, each mount point coincident with one of the L circles and defining a radius of that circle, wherein the radius is half of a parallax distance, and each circle defines one of L constructive, right cylinders, the axis of the cylinder perpendicular to the plane of the circle;

N digital cameras, wherein N is at least equal to M, each digital camera having a lens with a focal point and an optical axis and producing an image encoded in a digital output and having a horizontal field of view and a vertical field of view, the digital cameras mounted to the support structure so that each arm supports at least one digital camera so that (i) the focal point thereof is proximate to a mount point on that arm and (ii) the optical axis thereof is generally tangent to the cylinder corresponding to that mount point; and an image processor, coupled to the digital output of each of the N digital cameras, that forms L independent stereo view pairs, wherein, for each stereo view pair, the processor forms a left view from the digital outputs of a first set of the N cameras and forms a right view from the digital outputs of a second set of the N cameras, wherein the first and second sets are disjoint.

P2. A camera system according to claim P1, wherein at least one digital camera is mounted so that its horizontal field of view is subject to a partial obscuration by an object associated with an adjacent arm, and wherein the image processor compensates for the obscuration at least in part by a view available from one of the digital cameras mounted on an adjacent arm.

P3. A camera system according to claim P2, wherein the digital camera subject to the partial obscuration is mounted with an outward angle such that the partial obscuration is minimized.

P4. A camera system according to claim P1, wherein the left view and the right view both cover the 360 degree horizontal field of view.

P5. A camera system according to claim P1, wherein 1 or more of the N digital cameras are mounted such that the optical axis is not parallel with the horizontal plane.

P6. A camera system according to claim P5, wherein multiple digital cameras are mounted proximal to at least one mount point such that their vertical fields of view partially overlap to capture an extended elevation field of view.

P7. A camera system according to claim P1, wherein the digital cameras mounted proximal to mount points corresponding to one constructive cylinder are further mounted at an elevation with respect to the horizontal plane such that their fields of view are not obscured by any digital camera mounted proximal to a mount point that corresponds to a different constructive cylinder.

P8. A camera system according to claim P1, wherein the image processor further operates on the left view and the right view, of one or more of the L sets of digital cameras, to estimate the distance of items from the camera system using stereo triangulation.

P9. A method of providing a wide field-of-view image comprising:
a plurality of digital cameras that are each independently operable and a set of camera orientation sensors that are used to make orientation estimates of the camera platform during capture and wherein the image data from the digital cameras is fed to digital processing electronics that implements a processing algorithm that creates one or more wide field of view images, derived from the image data streams of two or more digital cameras and also encodes the orientation estimates into the image data stream that are subsequently written to a memory device.

P10. The method of claim P9, wherein the orientation estimates are used to control the encoding of the video data into memory to allow more efficient export of video for future replay.

P11. The method of claim P9, wherein the camera system is a wearable technology, qualified by a camera adhered to or otherwise mounted to the clothes, including helmets, gloves or shoes, of a human or animal user.

P12. An event viewing camera network comprising:
one or more wide field of view cameras that are operable to combine the video feeds of independent digital cameras into a wide field-of-view image stream, each wide field-of-view camera mounted at ideal locations to capture video data of an event of interest, wherein each wide field-of-view camera further incorporates digital processing electronics, a memory buffer, and a communications interface, where the video data is stored to the memory buffer and where the network is accessed by end-users to periodically select and off-load portions of the video stored in the memory buffer for permanent capture and possible playback of portions of the event of interest.

P13. The camera network of claim P12, wherein the wide field-of-view cameras are stereoscopic camera systems.

P14. The camera network of claim P13, wherein the wide field-of-view stereoscopic camera system is composed of multiple supersets of digital cameras such that each superset is oriented at a different parallax distance.

P15. The camera network of claim P14, wherein the different supersets of cameras utilize modified camera operational parameters to view the same scene from alternative points of view.

P16. The camera network of claim P12, wherein a central processing node is included where the video from all of the wide field of view cameras is collected and that forms the primary node of contact with end-users for managing user interfaces, specifying video clips of interest and delivering video clips electronically.

P17. The camera network of claim P12, wherein geolocation tags are added to the captured video to identify the location at which the video is captured.

P18. The camera network of claim P12, wherein the end-users communicate with the camera network through the communications interface and control their interactions with the system using device software that runs on the end-user's personal communication device and allows that user to obtain video clips.

P19. The camera network of claim P18, wherein the device software allows performance factors to be set by the end-user.

P20. The camera network of claim P19, wherein the device software includes the ability to select one or more of the following performance parameters: which wide field-of-view camera from which to capture video, the viewing frustum of captured video to purchase, the frame rate, the zoom factor, the resolution, the compression quality, the output format, or the period of time corresponding to the scene clip of interest.

P21. The camera network of claim P20, wherein preview windows for each wide field-of-view camera that shows a representation of the images to be captured from that wide field-of-view camera are included as part of the device software and the camera system is operable to communicate data from its memory buffer to the end-user's personal communication device to fill in data to these preview windows.

Embodiments of the present invention may include software that can be stored on a new transitory computer readable medium in addition to or for use with the disclosed camera platform. The invention may be embodied in many different forms, including, but in no way limited to, computer program logic for use with a processor (e.g., a microprocessor, microcontroller, digital signal processor, graphical, or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof.

Computer program logic implementing all or part of the functionality previously described herein may be embodied in various forms, including, but in no way limited to, a source code form, a computer executable form, and various intermediate forms (e.g., forms generated by an assembler, compiler, networker, or locator.) Source code may include a series of computer program instructions implemented in any of various programming languages (e.g., an object code, an assembly language, or a high-level language such as VHDL, Verilog, Cuda, Fortran, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device. The computer program may be fixed in any form in a signal that is transmittable to a computer using any of various communication technologies, including, but in no way limited to, analog technologies, digital technologies, optical technologies, wireless technologies, networking technologies, and internetworking technologies. The computer program may be distributed in any form as a removable storage medium with accompanying printed or electronic documentation (e.g., shrink wrapped software or a magnetic tape), preloaded with a computer system (e.g., on system ROM or fixed disk), or distributed from a server or electronic bulletin board over the communication system (e.g., the Internet or World Wide Web.)

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL.)

While the invention has been particularly shown and described with reference to specific embodiments, it will be understood by those skilled in the art that various changes in form and detail may be made therein without departing from the spirit and scope of the invention as defined by the appended clauses. As will be apparent to those skilled in the art, techniques described above for panoramas may be applied to images that have been captured as non-panoramic images, and vice versa.

What is claimed is:

1. A wide field-of-view stereoscopic camera system comprising:
    a support structure having M arms, where M is an integer equal to or greater than 2, each of the arms being spaced around a constructive circle and having a mount point, coincident with the circle, defining a radius of the circle, wherein the radius is half of a parallax distance, and the circle defines a horizontal plane and the circle defines a constructive right cylinder that contains that circle and that has an axis perpendicular to the horizontal plane and wherein each of the arms has a length adjustment to vary the distance between the center of the circle and the mount point;
    N digital cameras, wherein N is at least equal to M, each digital camera having a lens with a focal point and an optical axis and producing an image encoded in a digital output and having a horizontal field of view and a vertical field of view;
    the digital cameras mounted to the support structure so that each arm supports at least one digital camera so that (i) the focal point thereof is proximate to such arm's mount point and (ii) the optical axis thereof is generally tangent to the cylinder; and
    an image processor, coupled to the digital output of each of the N digital cameras, to form a stereo view pair, wherein the processor forms a left view from the digital outputs of a first set of the N cameras and forms a right view from the digital outputs of a second set of the N cameras, wherein the first and second sets are disjoint;
    wherein at least one digital camera is mounted so that its horizontal field of view is subject to a partial obscuration by an object associated with an adjacent arm forming blind area in its field of view, and wherein the image processor compensates for the obscuration at least in part by replacing the blind area with part of a view available from one of the digital cameras mounted on the adjacent arm.

2. A camera system according to claim 1, wherein the digital camera subject to the partial obscuration is mounted with an outward angle such that the partial obscuration is minimized.

3. A camera system according to claim 1, wherein the left view and the right view both cover the 360 degree horizontal field of view.

4. A camera system according to claim 1, wherein 1 or more of the N digital cameras are mounted such that the optical axis is not parallel with the horizontal plane.

5. A camera system according to claim 4, wherein 2 or more digital cameras are mounted proximal to at least one mount point such that their vertical fields of view partially overlap to capture an extended elevation field of view.

6. A system according to claim 1, wherein each of the arms is pivotally coupled to a mounting pole that passes through the center of the circle and is disposed perpendicularly with respect to the horizontal plane, each of the arms having a link pivotally attached to a circumferential support that is slidably coupled to the mounting pole, so that motion of the circumferential support along the mounting pole adjusts the radius of the circle and therefore the parallax distance.

7. A camera system according to claim 1, wherein each of the arms is coupled to a sliding arm mechanism that allows the arms to move in substantially radial direction and that includes a rack and pinion, so that rotational motion of the pinion around its central axis adjusts the radius of the circle and therefore the parallax distance.

8. A camera system according to claim 1, further comprising:
    a motorized drive coupled to at least one of the arms, and a controller coupled to the motorized drive, so as to cause adjustment in length of at least one of the arms,
    wherein the controller is coupled to one of the cameras on the at least one of the arms to receive from the camera at least one parameter of the camera and to cause an adjustment in length of at least one of the arms responsive to a change in the at least one parameter.

9. A wide field-of-view stereoscopic camera system comprising:
    a support structure having L sets of arms, where L is an integer greater than 1, and each set has at least 2 arms, each of the arms in a particular one of the sets being spaced around a distinct one of L constructive circles, and having a mount point, coincident with the distinct one circle, defining a radius of the circle, wherein the radius is half of a parallax distance and the radius of each of the L constructive circles is different, and the distinct one circle is contained within a plane that is parallel to a horizontal plane and that is at a height from the horizontal plane, where the height is measured as a distance along a constructive axis that is perpendicular to the horizontal plane, and wherein the plane corresponding to each of the L constructive circles is at a distinct height;
    N digital cameras, wherein N is at least equal to the number of arms in the camera system, each digital camera having a lens with a focal point and an optical axis and producing an image encoded in a digital output and having a horizontal field of view and a vertical field of view, the digital cameras mounted to the support structure so that each arm supports at least one digital camera so that (i) the focal point thereof is proximate to such arm's mount point and (ii) the optical axis thereof is generally tangent to the constructive circle corresponding to that mount point; and
    an image processor, coupled to the digital output of each of the N digital cameras, that forms at least one stereo view pair, wherein, for each stereo view pair, the processor forms a left view from the digital outputs of a first set of the N cameras and forms a right view from the digital outputs of a second set of the N cameras, wherein the first and second sets are disjoint.

10. A camera system according to claim 9, wherein at least one digital camera is mounted so that its horizontal field of view is subject to a partial obscuration by an object associated with an adjacent arm, and wherein the image processor compensates for the obscuration at least in part by a view available from one of the digital cameras mounted on an adjacent arm.

11. A camera system according to claim 10, wherein the digital camera subject to the partial obscuration is mounted with an outward angle such that the partial obscuration is minimized.

12. A camera system according to claim 9, wherein the left view and the right view of at least one set of L cameras both cover the 360 degree horizontal field of view.

13. A camera system according to claim 9, wherein 1 or more of the N digital cameras are mounted such that the optical axis is not parallel with the horizontal plane.

14. A camera system according to claim 13, wherein 2 or more digital cameras are mounted proximal to at least one mount point such that their vertical fields of view partially overlap to capture an extended elevation field of view.

15. A camera system according to claim 9, wherein the digital cameras mounted proximal to mount points corresponding to one constructive circle are further mounted at an elevation with respect to the horizontal plane such that their fields of view are not obscured by any digital camera mounted proximal to a mount point that corresponds to a different constructive circle.

16. A camera system according to claim 9, wherein each of the arms in at least one of the L sets of arms has a length adjustment to vary the distance between the center of the circle and the mount point.

17. A camera system according to claim 9, wherein the image processor further operates on the left view and the right view, of one or more of the L sets of digital cameras, to estimate the distance of items from the camera system using stereo triangulation.

18. A camera system according to claim 9, wherein the processor, responsive to a signal received by the processor, provides a selected one of the stereo view pairs as an output.

19. A camera system according to claim 9, wherein each of the L stereo pair of views is formatted to be compatible with a 3D display technology.

* * * * *